US012568128B2

(12) United States Patent
Sze et al.

(10) Patent No.: US 12,568,128 B2
(45) Date of Patent: Mar. 3, 2026

(54) SYSTEM CONFIGURATION AND COMMUNICATION METHOD TO ENABLE POST ACQUIRED ABILITY TO CONTROL AND COMMUNICATE WITH AD-HOC DEVICES

(71) Applicant: Ho Yin Wong, Hong Kong (HK)

(72) Inventors: Chun Kuen Sze, Hong Kong (HK); Ho Yin Wong, Hong Kong (HK)

(73) Assignee: Ho Yin Wong, Hong Kong (HK)

( * ) Notice: Subject to any disclaimer, the term of this patent is extended or adjusted under 35 U.S.C. 154(b) by 0 days.

(21) Appl. No.: 18/898,695

(22) Filed: Sep. 27, 2024

(65) Prior Publication Data

US 2025/0023929 A1    Jan. 16, 2025

Related U.S. Application Data

(63) Continuation of application No. PCT/CN2022/114003, filed on Aug. 22, 2022.

(51) Int. Cl.
*H04L 65/1104* (2022.01)
*H04L 69/08* (2022.01)
(52) U.S. Cl.
CPC .......... *H04L 65/1104* (2022.05); *H04L 69/08* (2013.01)
(58) Field of Classification Search
CPC ... H04L 65/1104; H04L 69/08; H04L 43/062; H04L 63/1416; H04L 41/22; H04W 4/38;
(Continued)

(56) References Cited

U.S. PATENT DOCUMENTS

| | | | | | |
|---|---|---|---|---|---|
| 11,463,526 | B2 * | 10/2022 | Justin | ................... | G06F 11/261 |
| 2006/0002329 | A1 * | 1/2006 | Madour | ............... | H04W 12/06 |
| | | | | | 370/328 |

(Continued)

OTHER PUBLICATIONS

T. Abels, R. Khanna and K. Midkiff, "Future proof IoT: Composable semantics, security, QOS and reliability," 2017 IEEE Topical Conference on Wireless Sensors and Sensor Networks (WiSNet), Phoenix, AZ, USA, 2017, pp. 1-4 (Year: 2017).*

(Continued)

*Primary Examiner* — Taylor A Elfervig

(57) ABSTRACT

The present disclosure provides a communication method, apparatus, device, and system, relating to the technical field of communications. During the communication between the controlee device and the control terminal, translation can be performed by the controller. As the SDP of the controlee device and the SDPID of the SDP are pre-created, the controller can translate all functions corresponding to the SDP to controller's native execution coding. When any functions need to be altered or any function needs to be added, it only needs to follow the same process to re-create a new SDP and the SDPID of the SDP, that is, functions of all devices can be re-defined in ad-hoc manner and the controller counterpart will accommodate on demand base on the very same mechanism. All these processes can be automatically conducted without user intervention or even awareness, from the user perspective, they never need to worry about the FW compatibility with their controller, all they need is to add "another" new controlee device into their system.

15 Claims, 13 Drawing Sheets

(58) Field of Classification Search
    CPC ..... H04W 12/37; H04W 76/10; H04W 36/36;
                  H04W 28/0215; G06F 21/606; G06F
                                                        9/451
    USPC ......................................................... 709/224
    See application file for complete search history.

(56)                   References Cited

U.S. PATENT DOCUMENTS

| | | | | |
|---|---|---|---|---|
| 2017/0079074 A1* | 3/2017 | Wu | ........................ | H04W 76/10 |
| 2017/0287090 A1* | 10/2017 | Hunn | ....................... | H04L 63/12 |
| 2018/0293587 A1* | 10/2018 | Oda | .......................... | G06F 9/54 |
| 2019/0188161 A1* | 6/2019 | Zhang | ................. | G06F 12/0246 |
| 2020/0322884 A1* | 10/2020 | Di Girolamo | ........ | H04W 12/06 |

OTHER PUBLICATIONS

P. Purswani, "Self-adaptive IoT," 2021 IEEE Symposium on Industrial Electronics & Applications (ISIEA), Langkawi Island, Malaysia, 2021, pp. 1-6, (Year: 2021).*
Alfonso et al, "Self-adaptive architectures in IoT systems: a systematic literature review", Springer Nature Link, vol. 12, No. 14, 2021, p. 1-28 (Year: 2021).*

\* cited by examiner

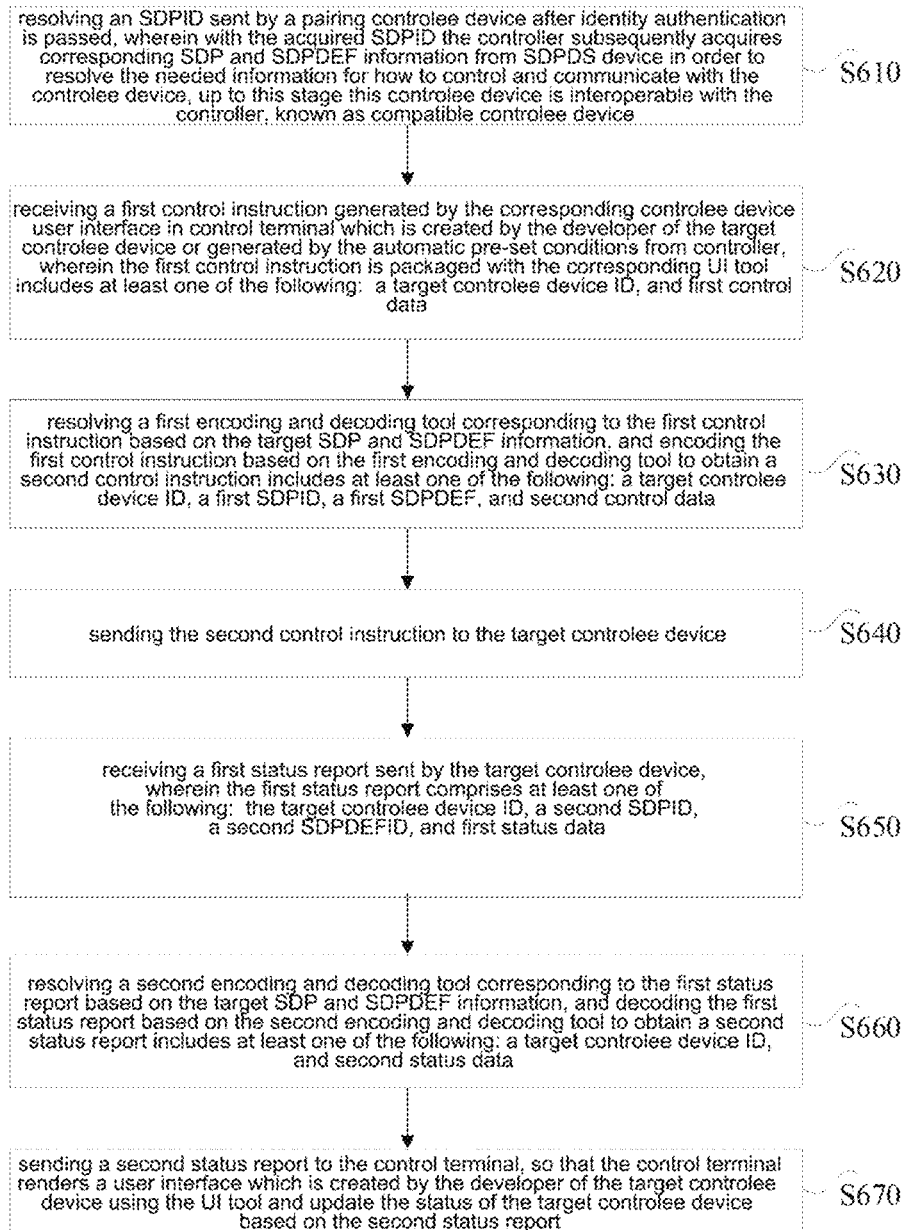

resolving an SDPID sent by a pairing controlee device after identity authentication is passed, wherein with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device     S610 receiving a first control instruction generated by the corresponding controlee device user interface in control terminal which is created by the developer of the target controlee device or generated by the automatic pre-set conditions from controller, wherein the first control instruction is packaged with the corresponding UI tool includes at least one of the following: a target controlee device ID, and first control data     S620 resolving a first encoding and decoding tool corresponding to the first control instruction based on the target SDP and SDPDEF information, and encoding the first control instruction based on the first encoding and decoding tool to obtain a second control instruction includes at least one of the following: a target controlee device ID, a first SDPID, a first SDPDEF, and second control data     S630 sending the second control instruction to the target controlee device     S640 receiving a first status report sent by the target controlee device, wherein the first status report comprises at least one of the following: the target controlee device ID, a second SDPID, a second SDPDEFID, and first status data     S650 resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data     S660 sending a second status report to the control terminal, so that the control terminal renders a user interface which is created by the developer of the target controlee device using the UI tool and update the status of the target controlee device based on the second status report     S670

FIG. 6

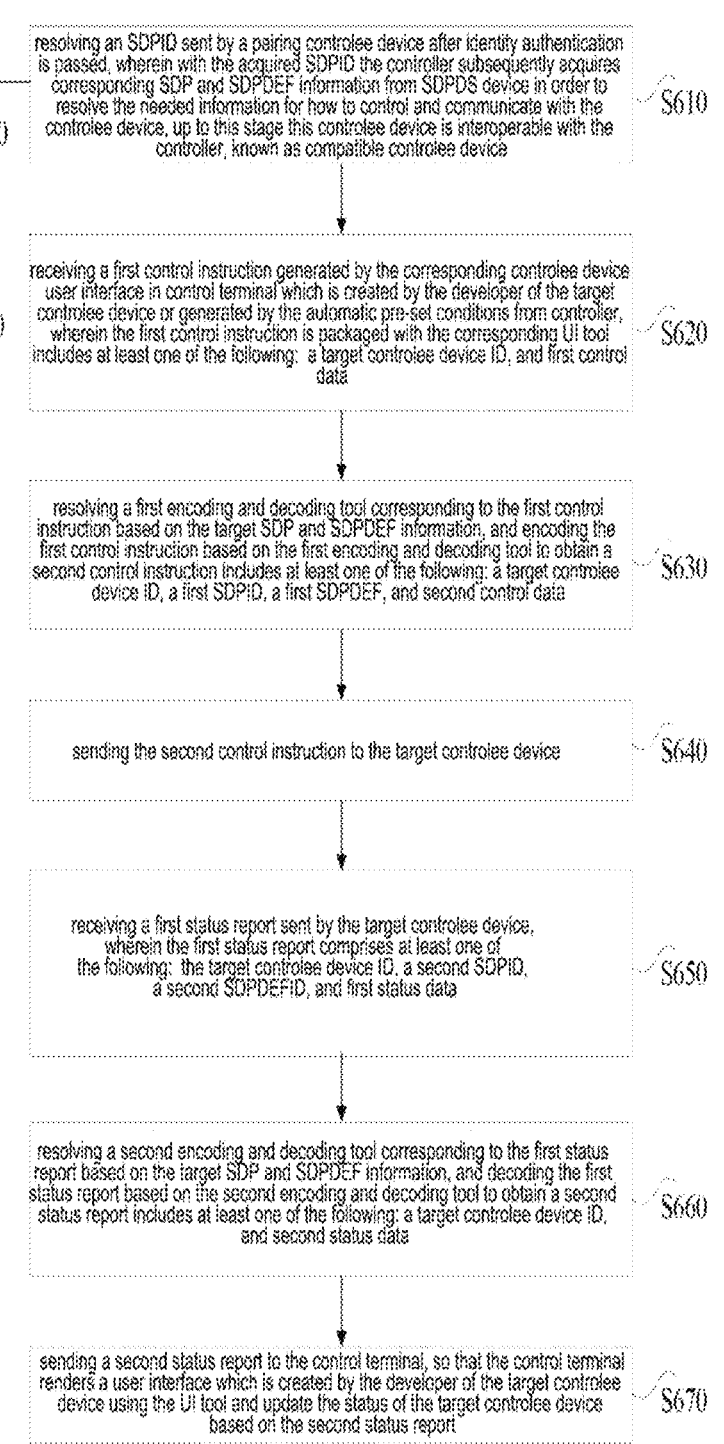

resolving an SDPID sent by a pairing controlee device after identity authentication is passed, wherein with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device — S610 receiving a first control instruction generated by the corresponding controlee device user interface in control terminal which is created by the developer of the target controlee device or generated by the automatic pre-set conditions from controller, wherein the first control instruction is packaged with the corresponding UI tool includes at least one of the following: a target controlee device ID, and first control data — S620 resolving a first encoding and decoding tool corresponding to the first control instruction based on the target SDP and SDPDEF information, and encoding the first control instruction based on the first encoding and decoding tool to obtain a second control instruction includes at least one of the following: a target controlee device ID, a first SDPID, a first SDPDEF, and second control data — S630 sending the second control instruction to the target controlee device — S640 receiving a first status report sent by the target controlee device, wherein the first status report comprises at least one of the following: the target controlee device ID, a second SDPID, a second SDPDEFID, and first status data — S650 resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data — S660 sending a second status report to the control terminal, so that the control terminal renders a user interface which is created by the developer of the target controlee device using the UI tool and update the status of the target controlee device based on the second status report — S670 sending a poll request to the target controlee device, wherein the poll request is used to fetch the first status report encoded based on SDP and SDPDEF information which is defined and registered by the developer of target controlee device — S710 resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data — S720 sending a second status report to the control terminal, so that the control terminal renders a user interface which is created by the developer of the target controlee device using the UI tool and update the status of the target controlee device based on the second status report — S730

FIG. 7

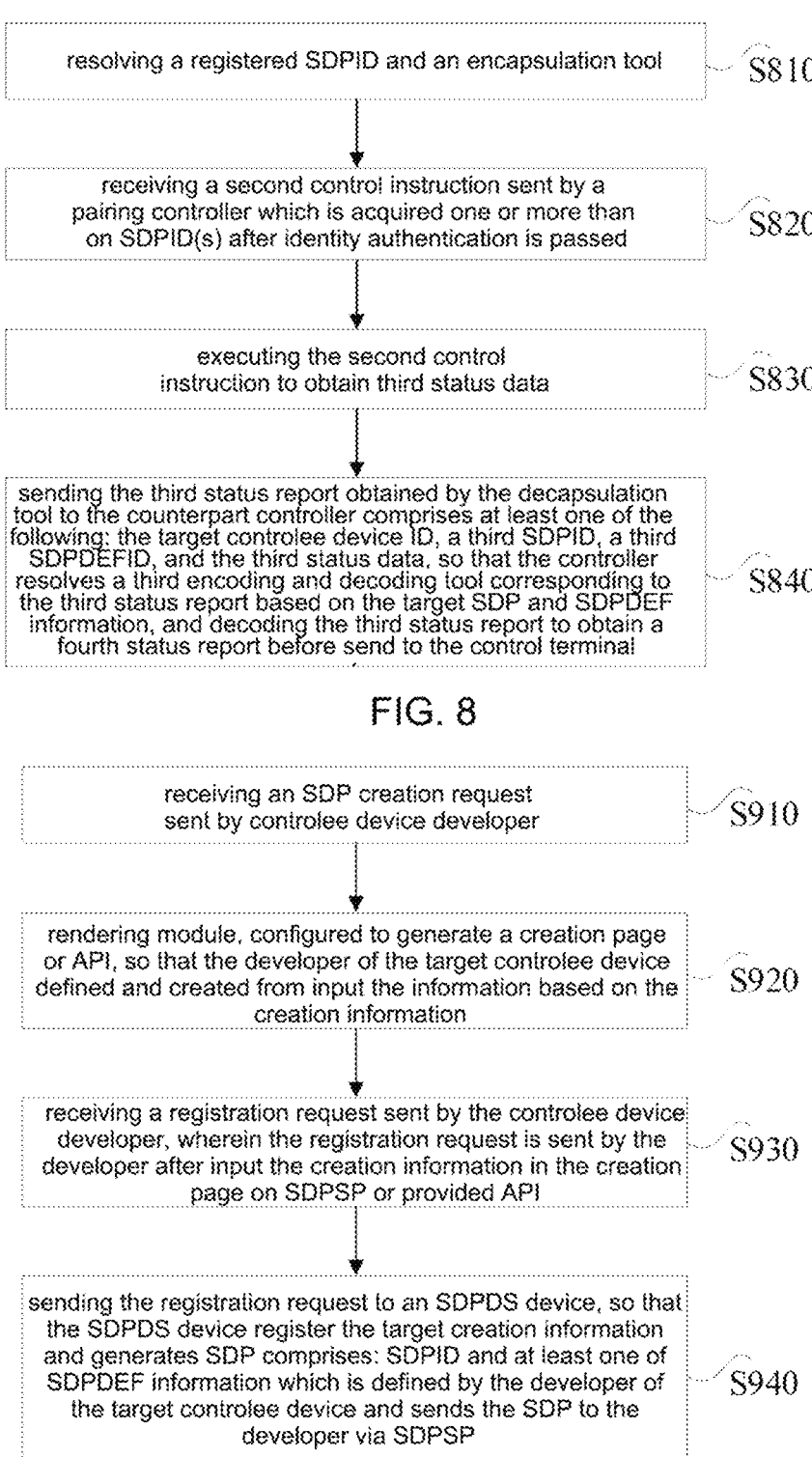

resolving a registered SDPID and an encapsulation tool — S810 receiving a second control instruction sent by a pairing controller which is acquired one or more than on SDPID(s) after identity authentication is passed — S820 executing the second control instruction to obtain third status data — S830 sending the third status report obtained by the decapsulation tool to the counterpart controller comprises at least one of the following: the target controlee device ID, a third SDPID, a third SDPDEFID, and the third status data, so that the controller resolves a third encoding and decoding tool corresponding to the third status report based on the target SDP and SDPDEF information, and decoding the third status report to obtain a fourth status report before send to the control terminal — S840

FIG. 8 receiving an SDP creation request sent by controlee device developer — S910 rendering module, configured to generate a creation page or API, so that the developer of the target controlee device defined and created from input the information based on the creation information — S920 receiving a registration request sent by the controlee device developer, wherein the registration request is sent by the developer after input the creation information in the creation page on SDPSP or provided API — S930 sending the registration request to an SDPDS device, so that the SDPDS device register the target creation information and generates SDP comprises: SDPID and at least one of SDPDEF information which is defined by the developer of the target controlee device and sends the SDP to the developer via SDPSP — S940

FIG. 9 determination module
1501 receiving module
1502 encoding and decoding
module
1503 sending module
1504 determination module
1601 receiving module
1602 executing module
1603 sending module
1604

1

SYSTEM CONFIGURATION AND COMMUNICATION METHOD TO ENABLE POST ACQUIRED ABILITY TO CONTROL AND COMMUNICATE WITH AD-HOC DEVICES

CROSS REFERENCE TO RELATED APPLICATIONS

The present application is a Continuation Application of PCT Application No. PCT/CN2022/114003 filed on Aug. 22, 2022, the contents of which are incorporated herein by reference in their entirety.

TECHNICAL FIELD

The present disclosure relates to the technical field of communications, and in particular, to a communication method, apparatus, device, and system.

BACKGROUND ART

Over the last decades, the smart home gadgets and IoT (internet of things) products have been emerged in stunning pace and becoming ubiquitous, there are diversified implementations, most of them were based on wireless communications, some well-known industrial standards gaining significant success, such as BLE, Wi-Fi, Z-Wave and Zigbee etc., they were implemented base on predefined protocol to realize data security and interoperability across products from different vendors, meaning function control codes of any compatible device (generally referring to intelligent device, such as sensors and actuators, here referred as "controlee devices") has to be pre-defined and when a controller (e.g., a gateway HUB) is produced, it has to programmed to support certain communication protocol in order to perform all the necessary functions of any "known" controlee device. In some way they managed to maintain backward compatibility, in other word, new generation controllers with updated protocol library can support older generation of controlee devices, however, this is one way compatibility, not vice versa.

In reality, no matter "industrial standard" or "proprietary protocol", they all have to release protocol revision update to address old design flaw or enable more advance applications from time to time, as a result, plenty of new generation controlee devices then developed and made available to consumers, these new generation controlee devices featured with more advance functions that is not or not totally compatible to controllers the consumer already owned, which was made in early time not necessarily possible to upgrade for supporting new protocols.

In summary, one of the most common challenges of conventional inter-operative protocol implemented so far, is the lack of self-adaptability to technology advancements and new innovations, it created a lot of compatibility frustration and waste in real world, in this regard, creating a self-adaptive protocol and implementation mechanism to realize practical future proof "forward compatible" IoT application would be a game changer.

SUMMARY

An objective of embodiments of the present disclosure includes providing a communication method, apparatus, device, and system, so as to solve the technical problem that the existing technology cannot effectively control all functions of all devices by a controller.

In order to solve the above problem, the embodiments of the present disclosure may be realized in the following manner.

In a first aspect, an embodiment of the present disclosure provides a communication method, wherein a structured device control/communication protocol information (hereinafter known as SDP) of a controlee device is pre-created, the SDP comprises: an SDP identifier (hereinafter known as SDPID) and at least one of SDP Data Encapsulation Format description table (hereinafter known as SDPDEF) information which is defined and registered by the developer of controlee device, corresponding to each SDPDEF information in SDP comprises: a decoding and encoding tool, a SDPDEF identifier (hereinafter known as SDPDEFID), and user interface control and display generation tool (hereinafter known as UI tool) used in the control terminal, and the method comprises:

a controller acquires one or more than one SDPID(s) sent by a pairing controlee device after identity authentication is passed, with the acquired SDPID the controller subsequently acquires corresponding SDP and SDPDEF information from SDP data storage (hereinafter known as SDPDS) device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDP submission portal interface (hereinafter known as SDPSP) from input of the device developer or created by adding SDPDEF information from developers of other compatible controlee devices via the SDPSP; and an optional user control terminal acquires the control information of captioned compatible controlee device from controller including the assigned name of such controlee device, and the corresponding information for user interface, which is created by the captioned developer, so that this control terminal can generate a proper user's interface and generate the control data and resolve status report to/from controlee device via controller; and the controller receiving a first control instruction generated by the corresponding controlee device user interface in control terminal which is created by the developer of the target controlee device or generated by the automatic pre-set conditions from controller, wherein the first control instruction is packaged with the corresponding UI tool includes at least one of the following: a target controlee device ID, and first control data; and the controller resolves a first encoding and decoding tool corresponding to the first control instruction based on the target SDP and SDPDEF information, and encoding the first control instruction based on the first encoding and decoding tool to obtain a second control instruction includes at least one of the following: a target controlee device ID, a first SDPID, a first SDPDEF, and second control data, so that the controller sending the second control instruction to the target controlee device.

In an optional embodiment, the method further includes: the controller receiving a first status report sent by the target controlee device, wherein the first status report comprises at least one of the following: the target controlee device ID, a second SDPID, a second SDPDEFID, and first status data, wherein the first SDPID and the second SDPID are the same, or the first SDPID and the second SDPID are different; and the controller resolves a second encoding and decoding tool corresponding to the first status report based on the target SDP and SDPDEF information, and decoding the first status report based on the second encoding and decoding tool to obtain a second status report includes at least one of the following: a target controlee device ID, and second status data; and the controller sending a second status report to the control terminal, so that the control terminal renders a user interface which is created by the developer of the target controlee device using the UI tool and update the status of the target controlee device based on the second status report.

In an optional embodiment, the controller acquires one or more than one SDPID(s) sent by a pairing controlee device after identity authentication is passed, with the acquired SDPID the controller subsequently acquires corresponding SDP and SDPDEF information from SDP data storage (hereinafter known as SDPDS) device in order to resolve the needed information for how to control and communicate with the controlee device, up to this stage this controlee device is interoperable with the controller, known as compatible controlee device, wherein the quantity of SDPIDs provided by the to be paired controlee device is at least one, and the corresponding SDP shall be created by the device developer or created by SDP submission portal interface (hereinafter known as SDPSP) from input of the device developer or created by adding SDPDEF information from developers of other compatible controlee devices via the SDPSP, the method further comprises:

the controller sending a poll request to the target controlee device, wherein the poll request is used to fetch the first status report encoded based on SDP and SDPDEF information which is defined and registered by the developer of target controlee device, and the first status report comprises at least one of the following: a target controlee device ID, a second SDPID, a second SDPDEFID, and second status data, wherein the first SDPID and the second SDPID are the same, or the first SDPID and the second SDPID are different; and the controller resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data; and the controller sending a second status report to the control terminal, so that the control terminal renders a user interface which is created by the developer of the target controlee device using the UI tool and update the status of the target controlee device based on the second status report.

In a second aspect, an embodiment of the present disclosure provides a communication method, including:

the target controlee device receiving a second control instruction sent by a pairing controller which is acquired one or more than on SDPID(s) after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP, wherein the second control instruction comprises at least one of the following: a target controlee device ID, a first SDPID, a first SDPDEFID, and second control data obtained by the controller encoding a first control instruction based on the first corresponding encoding and decoding tool; and the target controlee device executing the second control instruction and report third status data reflected the execution result; and the target controlee device sent the third status report obtained by the decapsulation tool to the counterpart controller comprises at least one of the following: the target controlee device ID, a third SDPID, a third SDPDEFID, and the third status data, so that the controller resolves a third encoding and decoding tool corresponding to the third status report based on the target SDP and SDPDEF information, and decoding the third status report to obtain a fourth status report, wherein the first SDPID, the second SDPID and the third SDPID are the same, or the first SDPID, the second SDPID, and the third SDPID are different; and the controller sending a fourth status report to the control terminal, so that the control terminal renders a user interface which is created by the developer of the target controlee device using the UI tool and update the status of the target controlee device based on the fourth status report.

In an optional embodiment, the method further includes:

the target controlee device receiving a poll request sent by the counterpart controller, wherein the poll request is used to fetch the first status report encoded based on SDP and SDPDEF information, the first status report comprises at least one of the following: a target controlee device ID, a second SDPID, a second SDPDEFID, and first status data; and the target controlee device sending a first status report to the counterpart controller, so that the controller resolves a second encoding and decoding tool corresponding to the first status report based on the SDP and SDPDEF information, and decoding the first status report based on the second encoding and decoding tool to obtain a second status report includes at least one of the following: a target controlee device ID, and second status data, wherein the first SDPID, the second SDPID and the third SDPID are the same, or the first SDPID, the second SDPID, and the third SDPID are different; and the controller sending a second status report to the control terminal, so that the control terminal renders a user interface which is created by the developer of the target controlee device using the UI tool and update the status of the target controlee device based on the second status report.

In a third aspect, an embodiment of the present disclosure provides a communication method, including:

an SDPSP receiving an SDP creation request sent by controlee device developer, wherein the creation request is sent by the developer when no compatible or suitable SDPDEF information has been found for target controlee device; and the SDPSP provide a creation page or application programming interface (hereinafter known as API), so that the developer of the target controlee device defined and created from input the information based on the creation information, the creation information comprises at least one SDPDEF information which is defined by the developer of controlee device, corresponding to each SDPDEF information comprises: a decoding and encoding tool, a SDPDEFID, and UI tool used in the control terminal; and the SDPSP receiving an SDP registration request sent by the controlee device developer, wherein the registration request is sent by the developer after input the creation information in the creation page on SDPSP or provided API; and the SDPSP sending the SDP registration request to a SDPDS device, so that the SDPDS device register the target creation information and generates SDP comprises: SDPID and at least one of SDPDEF information which is defined by the developer of the target controlee device, and sends the SDP to the developer via SDPSP, wherein the SDPSP and the SDPDS device are arranged in the same device, or the SDPSP and the SDPDS device are arranged in different devices.

In a fourth aspect, an embodiment of the present disclosure provides a communication method, including:

an SDPDS device receiving an SDP registration request sent by SDPSP, wherein the registration request with the creation information comprises at least one SDPDEF information which is defined by the developer of controlee device, so that the SDPDS generates SDP comprises: SDPID and at least one of SDPDEF information and send back to the developer via SDPSP, wherein the SDPSP and the SDPDS device are arranged in the same device, or the SDPSP and the SDPDS device are arranged in different devices.

In an optional embodiment, the method further includes:

the SDPDS device receiving a solicit request send by the controller wherein the solicit request comprises one or more than one SDPID(s) sent by a pairing controlee device after identity authentication is passed; and The SDPDS device identify an SDP data package corresponding to the target SDPID and send to the controller, wherein the SDP data package comprises: an SDPID, and at least one of SDPDEF information which is defined and registered by the developer of controlee device, corresponding to each SDPDEF information in SDP comprises: a decoding and encoding tool, and SDPDEFID, and UI tool.

In a fifth aspect, an embodiment of the present disclosure provides a controller, including a transceiver, a memory, and a processor, wherein the memory stores a computer program that can run on the processor, and when executing the computer program, the processor implements steps of the method of any one of the above embodiments.

In a sixth aspect, an embodiment of the present disclosure provides a controlee device, comprising a transceiver, a memory, and a processor, wherein the memory stores a computer program that can run on the processor, and when executing the computer program, the processor implements steps of the method of any one of the above embodiments.

In a seventh aspect, an embodiment of the present disclosure provides an SDPSP, comprising a transceiver, a memory, and a processor, wherein the memory stores a computer program that can run on the processor, and when executing the computer program, the processor implements steps of the method of any one of the above embodiments.

In an eighth aspect, an embodiment of the present disclosure provides an SDPDS device, comprising a transceiver, a memory, and a processor, wherein the memory stores a computer program that can run on the processor, and when executing the computer program, the processor implements steps of the method of any one of the above embodiments.

In a ninth aspect, an embodiment of the present disclosure provides a communication system, including the controller according to claim 9, the controlee device according to claim 10, the SDPSP according to claim 11, and the SDPDS device according to the preceding embodiments.

In a tenth aspect, an embodiment of the present disclosure provides a communication method, wherein an SDP of a controlee device is pre-created, the SDP comprises: an SDPID and at least one of SDPDEF information which is defined and registered by the developer of controlee device, corresponding to each SDPDEF information in SDP comprises: a decoding and encoding tool, and SDPDEFID, and UI tool used in the control terminal, and the method comprises: and a determination module, configured to resolve an SDPID sent by a pairing controlee device after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP; and a receiving module, configured to receive a first control instruction generated by the corresponding controlee device user interface in control terminal which is created by the developer of the target controlee device or generated by the automatic pre-set conditions from controller, wherein the first control instruction comprises at least one of the following: the target controlee device ID, and first control data; and an encoding and decoding module, configured to render a first encoding and decoding tool corresponding to the first control instruction based on the target SDP and SDPDEF information, and encode the first control instruction based on the first encoding and decoding tool to obtain a second control instruction; and a sending module, configured to send the second control instruction to the target controlee device, so that the target controlee device executes the second control instruction.

In an optional embodiment, the receiving module is further configured to receive a first status report sent by the target controlee device, and the first status report comprises at least one of the following: the target controlee device ID, a second SDPID, a second SDPDEFID, and first status data; and the encoding and decoding module is further configured to render a second encoding and decoding tool corresponding to the first status report based on the target SDP and SDPDEF information decode the first status report based on the second encoding and decoding tool to obtain a second status report; and the sending module is further configured to send the second status report to the control terminal, so that the control terminal renders a user interface which is created by the developer of the target controlee device using the UI tool and update the status of the target controlee device based on the second status report.

In an optional embodiment, the sending module is further configured to send a poll request to the target controlee device, wherein the poll request is used to fetch the first status report encoded based on SDP and SDPDEF information which is defined and registered by the developer of target controlee device, and the first status report comprises at least one of the following: a target controlee device ID, a second SDPID, a second SDPDEFID, and second status data;

the encoding and decoding module is further configured to resolve, based on the target SDP and SDPDEF information from target controlee device, and decoding the first status report based on the second encoding and decoding tool to obtain a second status report the sending module is further configured to send a second status report to the control terminal, so that the control terminal renders a user interface which is created by the developer of the target controlee device using the UI tool and update the status of the target controlee device based on the second status report.

In an eleventh aspect, an embodiment of the present disclosure provides a communication apparatus, including:

a determination module, configured to resolves a registered SDPID and an encapsulation tool; and a receiving module, configured to receive a second control instruction sent by a pairing controller which is acquired one or more than on SDPID(s) after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP, wherein the second control instruction comprises at least one of the following: a target controlee device ID, a first SDPID, a first SDPDEFID, and second control data obtained by the controller encoding a first control instruction based on the first corresponding encoding and decoding tool an executing module, configured to execute the second control instruction to obtain third status data; and a sending module, configured to send the third status report obtained by the decapsulation tool to the counterpart controller comprises at least one of the following: the target controlee device ID, a third SDPID, a third SDPDEFID, and the third status data, so that the controller resolves a third encoding and decoding tool corresponding to the third status report based on the target SDP and SDPDEF information, and decoding the third status report to obtain a fourth status report before send to the control terminal, so that the control terminal renders a user interface which is created by the developer of the target controlee device using the UI tool and update the status of the target controlee device based on the fourth status report.

In an optional embodiment, the receiving module is further configured to receive a poll request sent by the counterpart controller, wherein the poll request is used to acquire the first status report encoded based on SDP and SDPDEF information, the first status report comprises at least one of the following: a target controlee device ID, a second SDPID, a second SDPDEFID, and first status data; and the sending module is further configured to send a first status report to the counterpart controller, so that the controller resolves a second encoding and decoding tool corresponding to the first status report based on the SDP and SDPDEF information and decoding the first status report based on the second encoding and decoding tool to obtain a second status report.

In a twelfth aspect, an embodiment of the present disclosure provides a communication apparatus, including:

a receiving module, configured to receive an SDP creation request sent by controlee device developer, wherein the creation request is sent by the developer; and a rendering module, configured to generate a creation page or API, so that the developer of the target controlee device defined and created from input the information based on the creation information, the creation information comprises at least one SDPDEF information which is defined by the developer of controlee device, corresponding to each SDPDEF information comprises: a decoding and encoding tool, a SDPDEFID, and UI tool used in the control terminal; and the receiving module is further configured to receive a registration request sent by the controlee device developer, wherein the registration request is sent by the developer after input the creation information in the creation page on SDPSP or provided API; and the sending module is further configured to send the registration request to an SDPDS device, so that the SDPDS device register the target creation information and generates SDP comprises: SDPID and at least one of SDPDEF information which is defined by the developer of the target controlee device, and sends the SDP to the developer via SDPSP.

In a thirteenth aspect, an embodiment of the present disclosure provides a communication apparatus, including:

a receiving module, configured to receive a registration request sent by SDPSP, wherein the registration request with the creation information comprises at least one SDPDEF information which is defined by the developer of controlee device, so that the SDPDS generates SDP comprises: SDPID and at least one of SDPDEF information and send back to the developer via SDPSP.

a registering module, configured to register the target SDP and generate a target SDPID of the target SDP creation information; and a sending module, configured to send the target SDP to the developer of controlee device.

In an optional embodiment, the receiving module is further configured to receive a solicit request sent by a controller, wherein the solicit request comprises the target SDPID; and the determination module is further configured to identify an SDP corresponding to the target SDPID, wherein the SDP comprises: an SDPID, and at least one of SDPDEF information which is defined and registered by the developer of controlee device, corresponding to each SDPDEF information in SDP comprises: a decoding and encoding tool, and SDPDEFID, and UI tool; and a sending module, configured to send the target SDP to the controller.

The present disclosure provides a communication method, apparatus, device, and system, relating to the technical field of communications. During the communication between the controlee device and the control terminal, translation can be performed by the controller. As the SDP of the controlee device and the SDPID of the SDP are pre-created, the controller can translate all functions corresponding to the SDP to controller's native execution coding. When any functions need to be altered or any function needs to be added, it only needs to follow the same process to re-create a new SDP and the SDPID of the SDP, that is, functions of all devices can be re-defined in ad-hoc manner and the controller counterpart will accommodate on demand base on the very same mechanism. All these processes can be automatically conducted without user intervention or even awareness, from the user perspective, they never need to worry about the FW compatibility with their controller, all they need is to add "another" new controlee device into their system.

In order to make the above objectives, features, and advantages of the present disclosure more obvious and understandable, preferable embodiments are particularly illustrated in the following to give detailed descriptions in conjunction with the accompanying drawings.

BRIEF DESCRIPTION OF DRAWINGS

In order to more clearly illustrate technical solutions of embodiments of the present disclosure, accompanying drawings which need to be used in the embodiments of the present disclosure will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

FIG. 6 is a schematic flowchart of a communication method provided in an embodiment of the present disclosure;

FIG. 7 is a schematic flowchart of another communication method provided in an embodiment of the present disclosure;

FIG. 8 is a schematic flowchart of another communication method provided in an embodiment of the present disclosure;

FIG. 9 is a schematic flowchart of another communication method provided in an embodiment of the present disclosure;

DETAILED DESCRIPTION OF EMBODIMENTS

Figure 1:
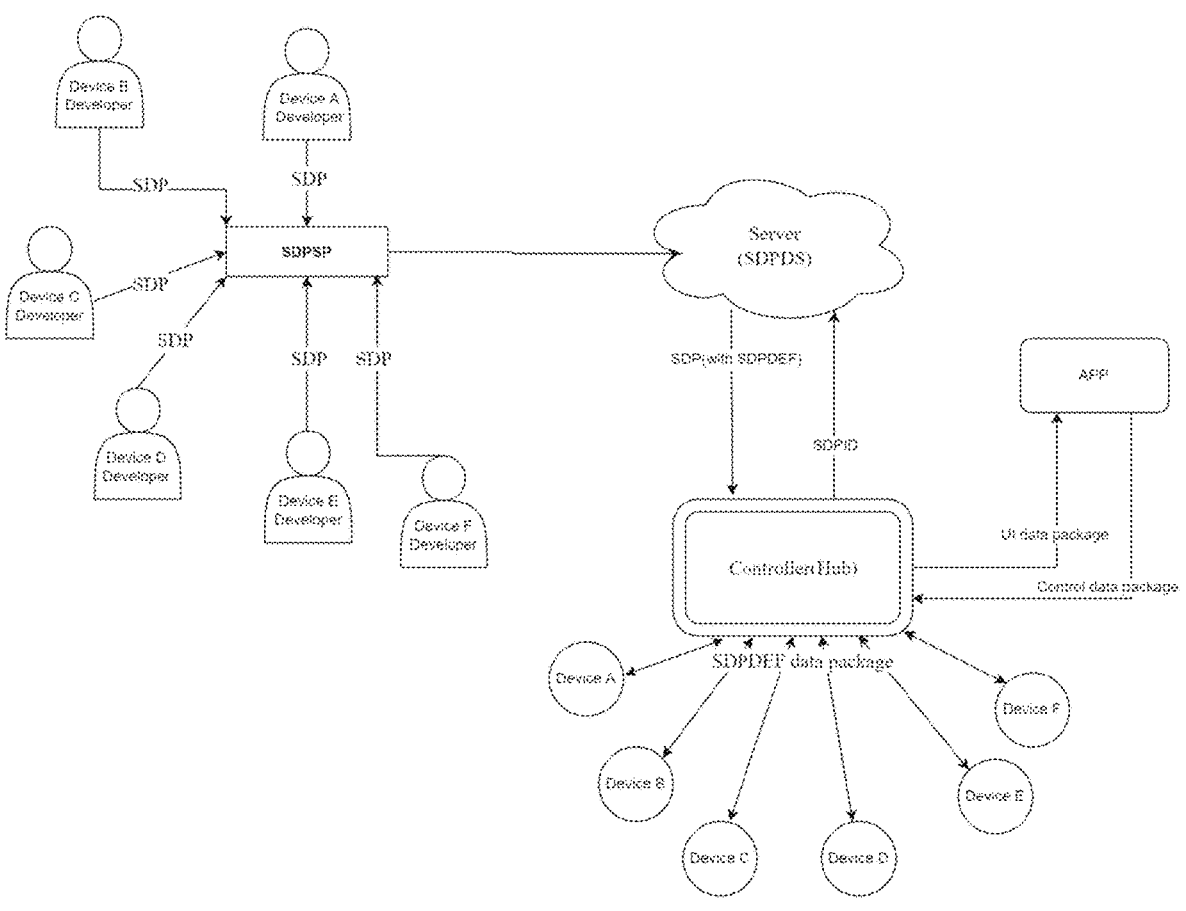
FIG. 1 is a structural schematic view of a communication system provided in an embodiment of the present disclosure.

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the scope of the present disclosure claimed, but merely illustrates chosen embodiments of the present disclosure. All of other embodiments obtained by those ordinarily skilled in the art based on the embodiments in the present disclosure without using any creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

Some embodiments of the present disclosure are described in detail below in combination with the drawings. The following embodiments and features in the embodiments may be combined with each other without conflict.

It needs to be noted that:

SDP (Structured Device control/communication Protocol information) is pre-created information by controlee device developer via the SDPSP (SDP Submission Portal interface) and stored on SDPDS (SDP Data Storage) device. Basically, the SDP may comprise: an SDPID (SDP identifier), at least one of SDPDEF (SDP Data Encapsulation Format description table) information.

SDPDEF is defined and registered by the developer of controlee device, it may include: a decoding and encoding tool, a SDPDEFID (SDPDEF identifier), UI tool (user interface control and display generation tool) used in the control terminal.

The SDPDEF is a format of encapsulation during data exchange in the controller, the controlee device, and the SDPDS. Each SDP may contain one or more pieces of SDPDEF information. All data can be modified on its own according to the controlee device or application requirements.

For example, basic formats of the SDPDEF may be as follows:

| Name | Data Type | Description |
| --- | --- | --- |
| class | Number | instruction set identifier |
| id | Number | instruction No. |
| payload | String | content |

In the above, the content of Payload is defined according to controlee device requirement of controlee device developer, wherein the developer must define the format and valid range of values in the payload.

As an example of the SDPDEF:

The below SDPDEF information is defined for switch control on and off status of the controlee device, which specifically may be as follows:

| Name | Data Type | Numerical Value |
| --- | --- | --- |
| class | Number | 1 |
| id | Number | 1 |
| payload | String | (Payload list) |

In the above, the format and valid range of value in the payload list as follows:

| Name | Numerical Value |
| --- | --- |
| off | 00 |
| on | FF |

As another example of the SDPDEF information, the below SDPDEF information is used to report switch status with the on and off status of the controlee device, which specifically may be as follows:

| Name | Data Type | Numerical Value |
| --- | --- | --- |
| class | Number | 1 |
| id | Number | 2 |
| payload | String | (Payload list) |

In the above, the format and valid range of value in the payload list as follows:

| Name | Numerical Value |
| --- | --- |
| off | 00 |
| on | FF | it should be noted that the SDPDEF information may comprise a version number, different version of SDPDEF information can be compatible or not compatible. Subsequent controlee developer can update the old version SDPDEF information to support the new version of SDPDEF information in the controlee device.

The decoder and the encoder of SDPDEF information: each SDPDEF information has a corresponding decoding and encoding tool, it may be generated by SDPSP or written in computer language by SDPDEF information developer via SDPSP. The decoding tool is used for decoding a report sent by the controlee device and obtain data which is used by control terminal. The encoding tool is used for encoding a control command sent by the control terminal and obtain data for controlling the controlee device.

Functions of the SDPDS (i.e., SDP database storage server) device may include: storing data related to the SDP; registering and allocating an SDP ID; storing data registered by developer input via SDPSP or API and storing a developer account; in some embodiments, the SDPDS may include decoding the data encapsulated with the SDPDEF information, and encoding the data the data encapsulated with the SDPDEF; in some embodiments, the SDPDS further may be configured to store the data registered by the controlee device, store the developer account, connect the controller and the control terminal, and generate an encapsulation tool (i.e., development kit code of SDPDEF) for the controlee device; and in some embodiments, the SDPDS further may be configured to store all encryption keys (DKEY, Device Key, and encryption key of controlee device), and the identifier of the controlee device (DID, Device id), and generate and allocate the DKEY and the DID.

In an embodiment of the present disclosure, the controller may be a local control gateway (Hub) with networking communication capability and may also be an online control server directly communicating with the controlee device. A specific form of the above controller is not limited in the embodiments of the present disclosure.

In an embodiment of the present disclosure, the controlee device may be various devices (for example, a sensor or an actuator, or a hybrid of a plurality of these devices (i.e., devices include sensor, actuator, or hybrid)) capable of supporting communication and control through the SDP; and the communication between the controller and the controlee device may be implemented in a wired or wireless manner.

In an embodiment of the present disclosure, the control terminal may be an APP in a mobile phone terminal, also may be a computer terminal, a dedicated controller terminal, the controller in the text, or a third party control panel of the unknown device. A form of the control terminal is not specifically limited in the embodiments of the present disclosure.

An embodiment of the present disclosure provides a communication system. The system includes at least one controller, at least one controlee device, at least one control terminal, at least one SDPSP, and at least one SDPDS device. In the above, the SDPSP and the SDPDS device cooperate with each other to implement functions such as development, registration, storage, and distribution of the SDP, the APP UI tool of the control terminal, and the SDP encoding and decoding tool.

Referring to FIG. 1, FIG. 1 is a structural schematic view of a communication system provided in an embodiment of the present disclosure. As shown in FIG. 1, the controller may be a Hub, and may also be referred to as a control gateway. There may be one or more controllers. The controlee device may be a device to be added, for example, devices A-F shown in FIG. 1, and the devices A-F communicate with the Hub based on the SDPDEF. The server may be an SDPDS, and the SDPDS and the Hub may also communicate based on the SDPDEF. The APP shown in FIG. 1 may be installed on a control terminal (e.g., a smart phone terminal).

In some embodiments, the SDPDS stores information such as SDP, SDP ID, DID, DKEY, and SDK, and the HUB may download information such as the SDP and DKEY from the SDPDS based on the information such as SDP ID or DID. The devices A-F may download information such as SDPID, DID, DKEY, and SDK from the SDPDS.

In some embodiments, the HUB may have a compilation (encoding and decoding) function, and in this case, the HUB may implement communication compilation between the devices A-F and the APP.

In some embodiments, the SDPDS may have a compilation function, and in this case, the SDPDS may implement communication compilation between the devices A-F and the APP.

The compilation herein mainly refers to encoding or decoding through the encoder and the decoder.

In some embodiments, as shown in FIG. 1, the registration portal interface included in the system may be an SDPSP, and developers of the devices A-F shown in FIG. 1 may refer to developers corresponding to different controlee devices, SDP, SDPDEF, and may also be developing devices (that is, the communication system also may include developing devices) used by other different controlee devices SDPDEF, for example, developing devices used by the SDPDEF of the devices A-F.

In some embodiments, the developers or the developing devices mainly develop the SDP corresponding to the controlee devices by the SDPSP and register and issue the developed SDP to the server by the SDPSP and the like.

In the above, when registering to the server, the server may generate the SDPID and return the SDP ID to the SDPSP, and finally present the SDP ID to the devices A-F developer.

Figure 2:
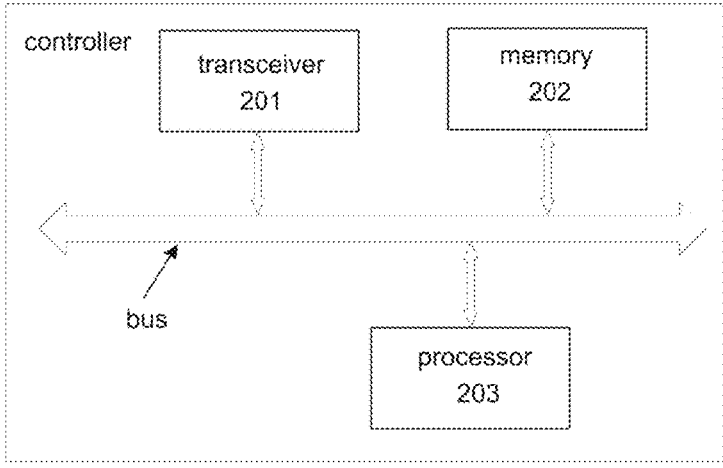
FIG. 2 is a structural schematic view of a controller provided in an embodiment of the present disclosure.

Referring to FIG. 2, FIG. 2 is a structural schematic view of a controller provided in an embodiment of the present disclosure. As shown in FIG. 2, the controller may include a transceiver 201, a memory 202, and a processor 203, for example, the foregoing HUB; and the memory 202 stores a computer program that can run on the processor 203. When executing the computer program, the processor 203 implements the following steps:

resolve an SDPID sent by a pairing controlee device after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP.

receiving a first control instruction generated by the corresponding controlee device user interface in control terminal which is created by the developer of the target controlee device or generated by the automatic pre-set conditions from controller, wherein the first control instruction comprises at least one of the following: the target controlee device ID, and first control data.

rendering a first encoding and decoding tool corresponding to the first control instruction based on the target SDP and SDPDEF information, and encode the first control instruction based on the first encoding and decoding tool to obtain a second control instruction.

sending the second control instruction to the target controlee device, so that the target controlee device executes the second control instruction.

Specifically, the SDP of a controlee device is pre-created, the SDP includes a SDPID and at least one of SDPDEF information which is defined and registered by the developer of the controlee device. Corresponding to each SDPDEF information in SDP includes a decoding and encoding tool, a SDPDEFID and UI tool used in the control terminal. After the controller acquired the corresponding SDP and SDPDEF information from SDPDS with to SDPID and send the UI tool to control terminal, so that the control terminal sends the first control instruction based on the UI tool of the SDPDEF information.

The number of SDPIDs sent by the target control device in the above is at least one, so there may be one or more one target SDP corresponding to the target controlee device in used.

It should be noted that, the information contained in the above first control instruction can resolves a unique first encoding and decoding tool corresponding to first control instruction, specifically, the first encoding and decoding tool corresponding to the first control instruction specifically may be a first encoding and decoding tool corresponding to the first SDPDEFID and the first SDPID in the first control instruction, and further mat be a first encoding and decoding tool corresponding to the identifier of the target controlee device in the first control instruction in the first control instruction and the first encoding and decoding tool is uniquely resolved by specific information contained in the first control instruction.

In some embodiments, the following steps further may be realized:

receiving a first status report sent by the target controlee device, and the first status report comprises at least one of the following: the target controlee device ID, a second SDPID, a second SDPDEFID, and first status data.

rendering a second encoding and decoding tool corresponding to the first status report based on the target SDP and SDPDEF information decode the first status report based on the second encoding and decoding tool to obtain a second status report.

the second status report to the control terminal, so that the control terminal renders a user interface which is created by the developer of the target controlee device using the UI tool and update the status of the target controlee device based on the second status report, It should be noted that, the information contained in the above first status report can resolve a unique second encoding and decoding tool corresponding to first status report, specifically, the second encoding and decoding tool corresponding to the first status report specifically may be a second encoding and decoding tool corresponding to the second SDPDEFID and the second SDPID in the first status report, and further may be a second encoding and decoding tool corresponding to the identifier of the target controlee device in the first status report, and the second encoding and decoding tool is uniquely resolved by specific information contained in the first status report.

In some embodiments, after the controller acquires one or more than one SDPID(s) sent by a pairing controlee device after identity authentication is passed, with the acquired SDPID the controller subsequently acquires corresponding SDP and SDPDEF information from SDPDS device, the following steps further may be realized:

sending a poll request to the target controlee device, wherein the poll request is used to fetch the first status report encoded based on SDP and SDPDEF information which is defined and registered by the developer of target controlee device, and the first status report comprises at least one of the following: a target controlee device ID, a second SDPID, a second SDPDEFID, and second status data.

resolves a second encoding and decoding tool corresponding to the first status report based on the target SDP and SDPDEF information, and decoding the first status report based on the second encoding and decoding tool to obtain a second status report includes at least one of the following: a target controlee device ID, and second status data.

sending a second status report to the control terminal, so that the control terminal renders a user interface which is created by the developer of the target controlee device using the UI tool and update the status of the target controlee device based on the second status report.

It should be noted that, the above first status report may be an initial status report (original status report) or may not be an initial status report (it also may be the first status report in the above). This is not specifically limited in the embodiments of the present disclosure.

Figure 3:
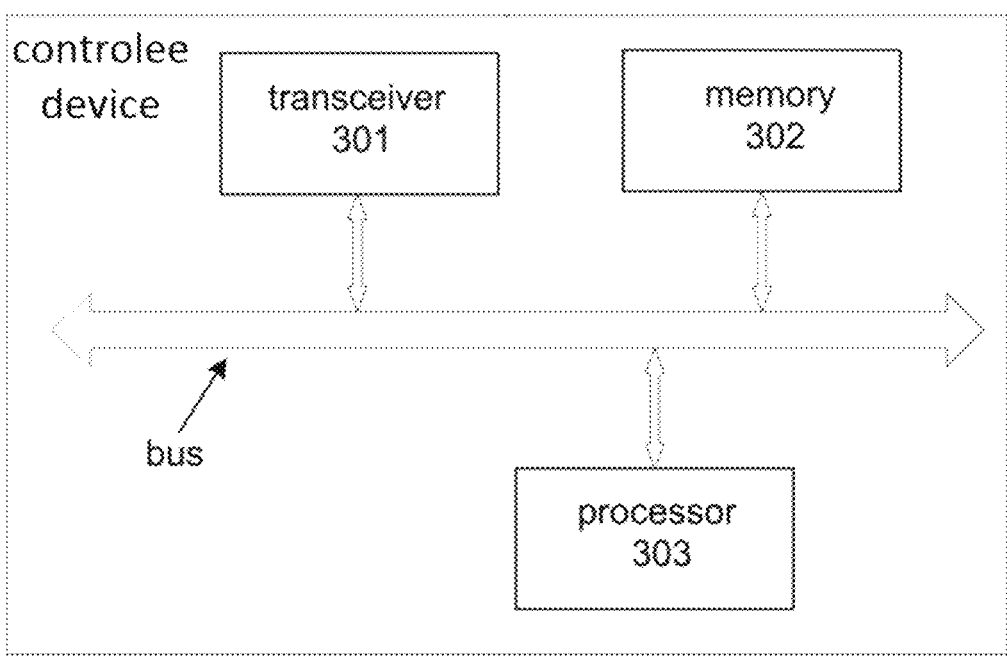
FIG. 3 is a structural schematic view of a controlee device provided in an embodiment of the present disclosure.

Referring to FIG. 3, FIG. 3 is a structural schematic view of a controlee device provided in an embodiment of the present disclosure. As shown in FIG. 3, the controlee device may include a transceiver 301, a memory 302, and a processor 303; the memory 302 stores a computer program that can run on the processor 303. When executing the computer program, the processor 303 implements the following method steps:

determining a registered SDP ID and an encapsulation tool.

receiving a second control instruction sent by a pairing controller which is acquired one or more than on SDPID(s) after identity authentication is passed, wherein the second control instruction comprises at least one of the following: a target controlee device ID, a first SDPID, a first SDPDEFID, and second control data obtained by the controller encoding a first control instruction based on the first corresponding encoding and decoding tool.

executing the second control instruction and report third status data reflected the execution result; and the target controlee device sent the third status report obtained by the decapsulation tool to the counterpart controller.

resolves a third encoding and decoding tool corresponding to the third status report based on the target SDP and SDPDEF information, and decoding the third status report to obtain a fourth status report.

sending a fourth status report to the control terminal, so that the control terminal renders a user interface which is created by the developer of the target controlee device using the UI tool and update the status of the target controlee device based on the fourth status report.

Specifically, the first SDPID, the second SDPID and the third SDPID are the same, or the first SDPID, the second SDPID, and the third SDPID are different. This is not specifically limited in the embodiments of the present disclosure.

In some embodiments, the method further includes:

receiving a poll request sent by the counterpart controller, wherein the poll request is used to fetch the first status report encoded based on SDP and SDPDEF information, the first status report comprises at least one of the following: a target controlee device ID, a second SDPID, a second SDPDEFID, and first status data.

resolves a second encoding and decoding tool corresponding to the first status report based on the SDP and SDPDEF information, and decoding the first status report based on the second encoding and decoding tool to obtain a second status report.

sending a second status report to the control terminal, so that the control terminal renders a user interface which is created by the developer of the target controlee device using the UI tool and update the status of the target controlee device based on the second status report.

Figure 4:
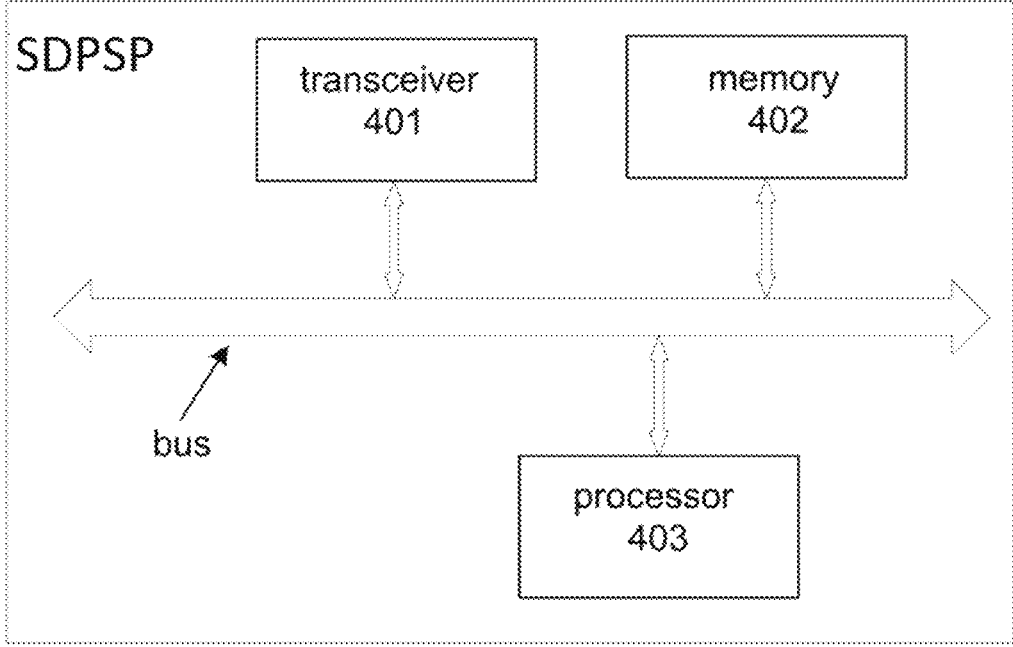
FIG. 4 is a structural schematic view of an SDPSP provided in an embodiment of the present disclosure.

Referring to FIG. 4, FIG. 4 is a structural schematic view of an SDPSP provided in an embodiment of the present disclosure. As shown in FIG. 4, the SDPSP may include a transceiver 401, a memory 402, and a processor 403; the memory 402 stores a computer program that can run on the processor 403. When executing the computer program, the processor 403 implements the following method steps:

receiving an SDP creation request sent by controlee device developer, wherein the creation request is sent by the developer rendering a creation page or API, so that the developer of the target controlee device defined and created from input the information based on the creation information, the creation information comprises at least one SDPDEF information which is defined by the developer of controlee device. Corresponding to each SDPDEF information comprises: a decoding and encoding tool, a SDPDEFID, and UI tool used in the control terminal.

receiving a registration request sent by the controlee device developer, wherein the registration request is sent by the developer after input the creation information in the creation page on SDPSP or provided API.

sending the registration request to an SDPDS device, so that the SDPDS device register the target creation information and generates SDP comprises: SDPID and at least one of SDPDEF information which is defined by the developer of the target controlee device, and sends the SDP to the developer via SDPSP.

Specifically, the above developer further may be a developing controlee device, and in addition to creating the target SDPDEF information with the encoding and decoding tool and SDPDEFID, the developer further can create an UI tool corresponding to the target SDPDEF information based on the SDPDEF input, specifically, a UI module provided by the SDPSP may be used, to establish an independent UI tool used by each piece of target SDPDEF information, and the target SDP further may include a UI tool corresponding to each piece of target SDPDEF information.

Figure 5:
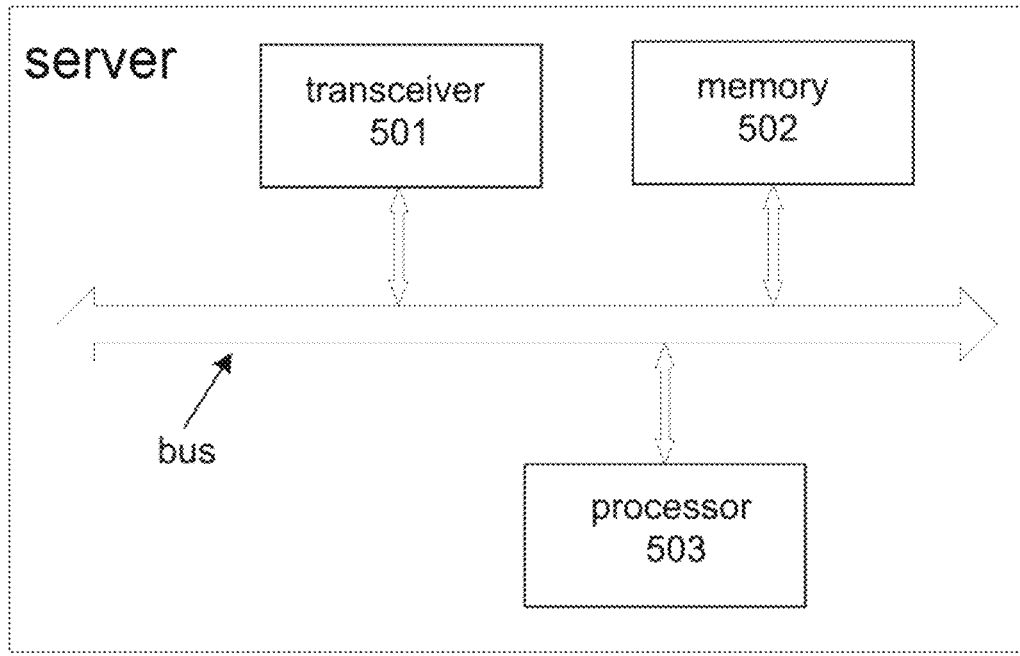
FIG. 5 is a structural schematic view of an SDPDS device provided in an embodiment of the present disclosure.

Referring to FIG. 5, FIG. 5 is a structural schematic view of an SDPDS device provided in an embodiment of the present disclosure. As shown in FIG. 5, the server may include a transceiver 501, a memory 502, and a processor 503; the memory 502 stores a computer program that can run on the processor 503. When executing the computer program, the processor 503 implements the following method steps:

receiving an SDP registration request sent by SDPSP, wherein the registration request with the creation information comprises at least one SDPDEF information which is defined by the developer of controlee device registering the target SDP and SDP ID.

sending the SDPID and SDPDEF information to the developer via SDPSP.

Specifically, the target SDP file further may include a UI tool corresponding to each piece of target SDPDEF information.

In some embodiments, the method further includes:

receiving a solicit request send by the controller wherein the solicit request comprises one or more than one SDPID(s) sent by a pairing controlee device after identity authentication is passed.

Identify an SDP data package corresponding to the target SDPID and send to the controller.

Specifically, the SDP further may include a UI tool corresponding to each piece of SDPDEF information.

In the above, the memory in FIGS. 2-5 may contain a high-speed random access memory (RAM), and also may include a non-volatile memory, for example, at least one disk memory. Communication connection between this system network element and at least one other network element is realized through at least one communication interface (possibly wired or wireless), and Internet, Wide Area Network, local network, Metropolitan Area Network and so on may be used.

A bus may be an ISA bus, a PCI bus, or an EISA bus and so on. The bus may be an address bus, a data bus, a control bus and so on. For ease of representation, the bus is represented merely with one two-way arrow in FIGS. 2-5, but it does not mean that there is only one bus or one type of bus.

In the above, the memory is configured to store programs, and the processor executes the programs upon receipt of an execution instruction. The method executed by the apparatus defined by the process disclosed in any embodiment of the present disclosure in the preceding can be applied to the processor, or implemented by the processor.

The processor may be an integrated circuit chip, with a signal processing function. In an implementation process, various steps of the above method may be completed by an integrated logic circuit of hardware in the processor or instruction in a software form. The above processor may be a general-purpose processor, including central processing unit (CPU for short), network processor (NP for short), etc., and also may be a digital signal processor (DSP for short), an application specific integrated circuit (ASIC for short), a field-programmable gate array (FPGA for short) or other programmable logic devices, discrete gates, transistor logic devices, or discrete hardware components that can realize or implement various methods, steps, and logic blocks disclosed in the present disclosure. The general-purpose processor may be a microprocessor or the processor also may be any conventional processor and so on. The steps in the method disclosed in the present disclosure may be directly carried out and completed by hardware decoding processor, or carried out and completed by combining hardware and software modules in the decoding processor. The software module may be located in a mature storage medium in the art such as a random access memory, a flash memory, a read-only memory, a programmable read-only memory or an electrically erasable programmable memory, and register.

The storage medium is located in the memory, and the processor reads information in the memory, and is combined with hardware thereof to complete the steps of the above method.

Referring to FIG. 6, FIG. 6 is a schematic flowchart of a communication method provided in an embodiment of the present disclosure. An SDP of a controlee device is pre-created, the SDP comprises: an SDPID and at least one of SDPDEF information which is defined and registered by the developer of controlee device. Corresponding to each SDPDEF information in SDP comprises: a decoding and encoding tool, and SDPDEFID, and UI tool used in the control terminal; and as shown in FIG. 6, the method may be applied to a controller, such as HUB, and the method may include the following steps:

S610, resolving an SDPID sent by a pairing controlee device after identity authentication is passed, wherein with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP.

S620, receiving a first control instruction generated by the corresponding controlee device user interface in control terminal which is created by the developer of the target controlee device or generated by the automatic pre-set conditions from controller, wherein the first control instruction is packaged with the corresponding UI tool includes at least one of the following: a target controlee device ID, and first control data, S630, resolving a first encoding and decoding tool corresponding to the first control instruction based on the target SDP and SDPDEF information, and encoding the first control instruction based on the first encoding and decoding tool to obtain a second control instruction includes at least one of the following: a target controlee device ID, a first SDPID, a first SDPDEF, and second control data.

S640, sending the second control instruction to the target controlee device.

Specifically, the SDP of a controlee device is pre-created, the SDP includes a SDPID and at least one of SDPDEF information which is defined and registered by the developer of the controlee device. Corresponding to each SDPDEF information in SDP includes a decoding and encoding tool, a SDPDEFID and UI tool used in the control terminal. After the controller acquired the corresponding SDP and SDPDEF information from SDPDS with to SDPID and send the UI tool to control terminal, so that the control terminal sends the first control instruction based on the UI tool of the SDPDEF information.

The number of SDPIDs sent by the target control device in the above is at least one, so there may be one or more one target SDP corresponding to the target controlee device in used.

It should be noted that, the information contained in the above first control instruction can resolve a unique first encoding and decoding tool corresponding to the first control instruction, specifically, the first encoding and decoding tool corresponding to the first control instruction specifically may be a first encoding and decoding tool corresponding to the first SDPID and the first SDPDEFID in the first control instruction, and further may be a first encoding and decoding tool corresponding to the identifier of the target controlee device in the first control instruction, and the first encoding and decoding tool is uniquely resolve d by specific information contained in the first control instruction.

Through the embodiments of the present disclosure provides a communication method, apparatus, device, and system, relating to the technical field of communications. During the communication between the controlee device and the control terminal, translation can be performed by the controller. As the SDP information of the controlee device and the SDPID of the SDP information are pre-created, the controller can translate all functions corresponding to the SDP information to controller's native execution coding. When any functions need to be altered or any function needs to be added, it only needs to follow the same process to re-create a new SDP information and the SDPID of the SDP information, that is, functions of all devices can be re-defined in ad-hoc manner and the controller counterpart will accommodate on demand base on the very same mechanism. All these processes can be automatically conducted without user intervention or even awareness, from the user perspective, they never need to worry about the FW compatibility with their controller, all they need is to add "another" new controlee device into their system.

In some embodiments, the method further includes:

S650, receiving a first status report sent by the target controlee device, wherein the first status report comprises at least one of the following: the target controlee device ID, a second SDPID, a second SDPDEFID, and first status data.

S660, resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data.

S670, sending a second status report to the control terminal, so that the control terminal renders a user interface which is created by the developer of the target controlee device using the UI tool and update the status of the target controlee device based on the second status report.

It should be noted that, the information contained in the above first status report can resolve a unique second encoding and decoding tool corresponding to first status report, specifically, the second encoding and decoding tool corresponding to the first status report specifically may be a second encoding and decoding tool corresponding to the second SDPDEFID and the second SDPID in the first status report, and further may be a second encoding and decoding tool corresponding to the identifier of the target controlee device in the first status report, and the second encoding and decoding tool is uniquely resolved by specific information contained in the first status report.

It should be noted that, the above first status report may be an initial status report (original status report) or may not be an initial status report (it also may be the first status report in the above). This is not specifically limited in the embodiments of the present disclosure.

Besides, as shown in FIG. 7, after the controller acquires one or more than one SDPID(s) sent by a pairing controlee device after identity authentication is passed, with the acquired SDPID the controller subsequently acquires corresponding SDP and SDPDEF information from SDP device, the controller further may send a poll request to the target controlee device to get the status through the following steps:

S710, sending a poll request to the target controlee device, wherein the poll request is used to fetch the first status report encoded based on SDP and SDPDEF information which is defined and registered by the developer of target controlee device, and the first status report comprises at least one of the following: a target controlee device ID, a second SDPID, a second SDPDEFID, and second status data.

S720, resolving a second encoding and decoding tool corresponding to the first status report based on the target SDP and SDPDEF information, and decoding the first status report based on the second encoding and decoding tool to obtain a second status report includes at least one of the following: a target controlee device ID, and second status data.

S730, sending a second status report to the control terminal, so that the control terminal renders a user interface which is created by the developer of the target controlee device using the UI tool and update the status of the target controlee device based on the second status report.

It should be noted that, the above first status report may be an initial status report (original status report) or may not be an initial status report (it also may be the first status report in the above). This is not specifically limited in the embodiments of the present disclosure.

Referring to FIG. 8, FIG. 8 is a schematic flowchart of a communication method provided in an embodiment of the present disclosure. As shown in FIG. 8, the method may include:

S810, resolving a registered SDPID and an encapsulation tool.

S820, receiving a second control instruction sent by a pairing controller which is acquired one or more than on SDPID(s) after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP, wherein the second control instruction comprises at least one of the following: a target controlee device ID, a first SDPID, a first SDPDEFID, and second control data obtained by the controller encoding a first control instruction based on the first corresponding encoding and decoding tool.

S830, executing the second control instruction to obtain third status data.

S840, sending the third status report obtained by the decapsulation tool to the counterpart controller comprises at least one of the following: the target controlee device ID, a third SDPID, a third SDPDEFID, and the third status data, so that the controller resolves a third encoding and decoding tool corresponding to the third status report based on the target SDP and SDPDEF information, and decoding the third status report to obtain a fourth status report before send to the control terminal, so that the control terminal renders a user interface which is created by the developer of the target controlee device using the UI tool and update the status of the target controlee device based on the fourth status report.

Specifically, the third SDPID may be the same as the first SDPID, and may be different from the first SDPID. Similarly, the third SDPDEFID may be the same as the first SDPDEFID, and may be different from the first SDPDEFID. This is not specifically limited in the embodiments of the present disclosure.

In some embodiments, the method further includes:

receiving a poll request sent by the counterpart controller, wherein the poll request is used to acquire the first status report encoded based on SDP and SDPDEF information, the first status report comprises at least one of the following: a target controlee device ID, a second SDPID, a second SDPDEFID, and first status data.

resolves a second encoding and decoding tool corresponding to the first status report based on the SDP and SDPDEF information and decoding the first status report based on the second encoding and decoding tool to obtain a second status report.

Referring to FIG. 9, FIG. 9 is a schematic flowchart of another communication method provided in an embodiment of the present disclosure. As shown in FIG. 9, the method may include:

S910, receiving an SDP creation request sent by controlee device developer, wherein the creation request is sent by the developer.

S920, rendering module, configured to generate a creation page or API, so that the developer of the target controlee device defined and created from input the information based on the creation information, the creation information comprises at least one SDPDEF information which is defined by the developer of controlee device. Corresponding to each SDPDEF information comprises: a decoding and encoding tool, a SDPDEFID, and UI tool used in the control terminal.

S930, receiving a registration request sent by the controlee device developer, wherein the registration request is sent by the developer after input the creation information in the creation page on SDPSP or provided API.

S940, sending the registration request to an SDPDS device, so that the SDPDS device register the target creation information and generates SDP comprises: SDPID and at least one of SDPDEF information which is defined by the developer of the target controlee device and sends the SDP to the developer via SDPSP.

Specifically, the above developer further may be a developing device, and in addition to creating the target SDPDEF information and the encoding and decoding tool corresponding to the target SDPDEF information, the developer further can create an UI tool corresponding to the target SDPDEF information based on the SDPSP input, specifically, a UI module provided by the SDPSP may be used, to establish an independent UI tool used by each piece of target SDPDEF information, and the target SDP further may include a UI tool corresponding to each piece of target SDPDEF information.

Figure 10:
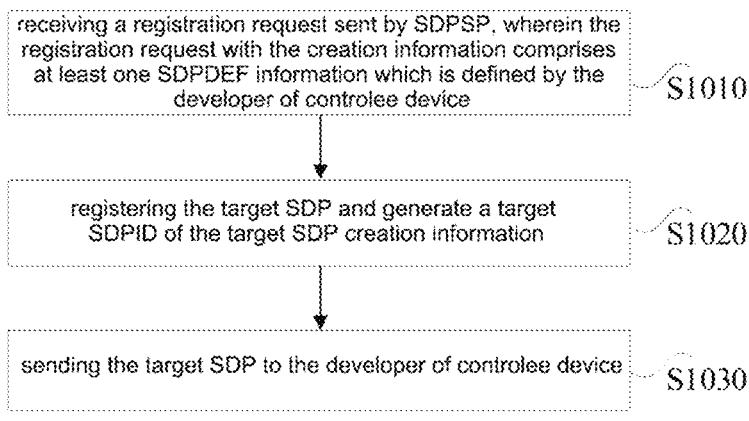
FIG. 10 is a schematic flowchart of another communication method provided in an embodiment of the present disclosure.

Referring to FIG. 10, FIG. 10 is a schematic flowchart of another communication method provided in an embodiment of the present disclosure. As shown in FIG. 10, the method may include:

S1010, receiving a registration request sent by SDPSP, wherein the registration request with the creation information comprises at least one SDPDEF information which is defined by the developer of controlee device, so that the SDPDS generates SDP comprises: SDPID and at least one of SDPDEF information and send back to the developer via SDPSP.

S1020, registering the target SDP and generate a target SDPID of the target SDP creation information.

S1030, sending the target SDP to the developer of controlee device.

Specifically, the target SDP further may include a UI tool corresponding to each piece of target SDPDEF information.

In some embodiments, the method further includes:

receiving a solicit request send by the controller wherein the solicit request comprises one or more than one SDPID(s) sent by a pairing controlee device after identity authentication is passed.

Identify an SDP data package corresponding to the target SDPID and send to the controller, wherein the SDP data package comprises: an SDPID, and at least one of SDPDEF information which is defined and registered by the developer of controlee device, corresponding to each SDPDEF information in SDP comprises: a decoding and encoding tool, and SDPDEFID, and UI tool.

Figure 11:
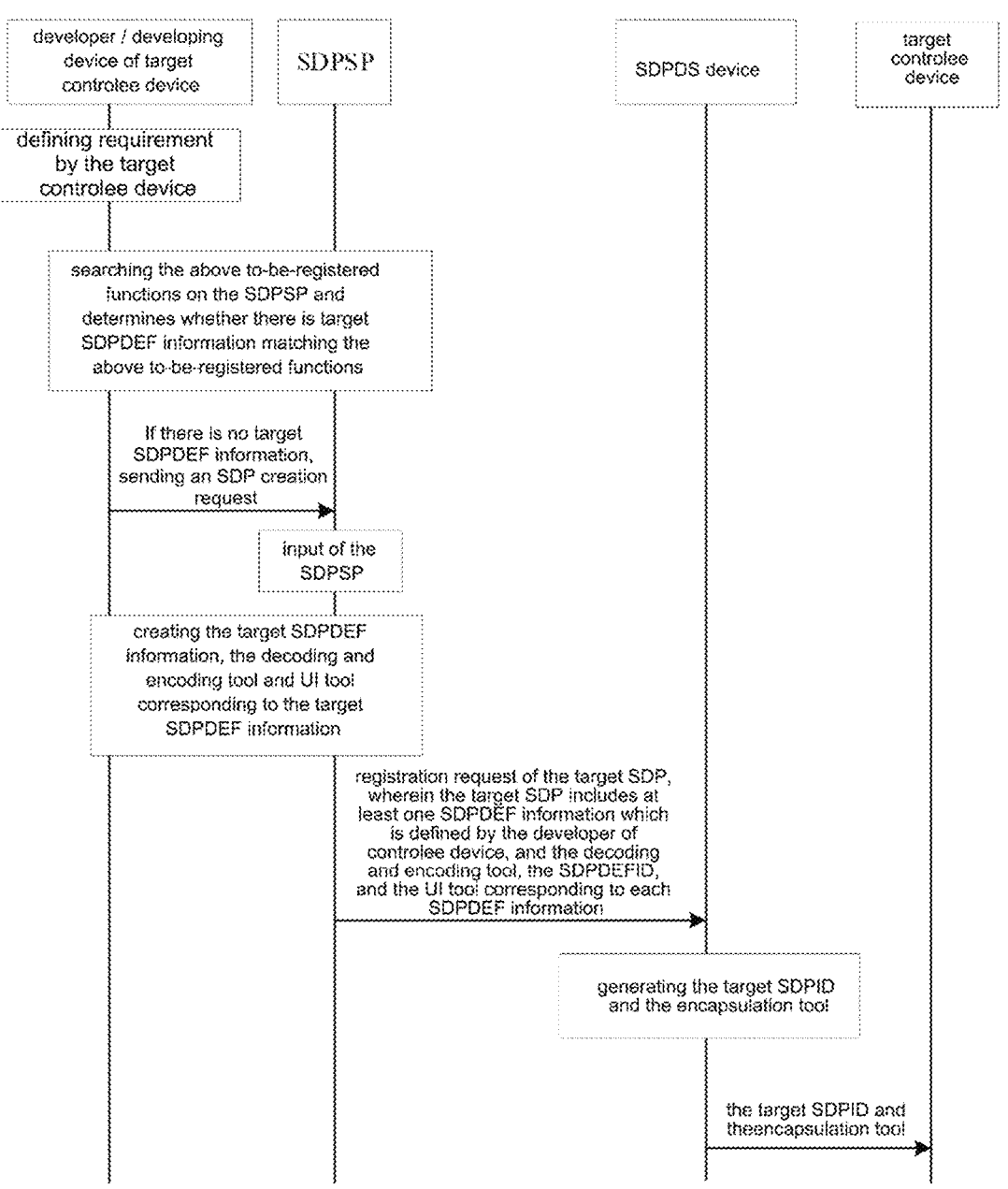
FIG. 11 is a schematic flowchart of a development method for a target controlee device provided in an embodiment of the present disclosure.

Referring to FIG. 11, FIG. 11 is a schematic flowchart of a development method for a target controlee device provided in an embodiment of the present disclosure.

When developing a target controlee device, a developer or a developing device of the target controlee device needs to define a requirement by the target controlee device, i.e., to-be-registered functions, for example, the to-be-registered functions of an air conditioner controller include: wind speed control, wind speed report, mode control, mode report, temperature control, and temperature report.

Then, the developer or the developing device of the target controlee device searches the above to-be-registered functions on the SDPSP and determines whether there is target SDPDEF information matching the above to-be-registered functions. For example, a search result is:

| Function | Status | SDP ID | CLASS | ID |
|---|---|---|---|---|
| wind speed control | unregistered | — | — | — |
| wind speed report | unregistered | — | — | — |
| mode control | unregistered | — | — | — |
| mode report | unregistered | — | — | — |
| temperature control | registered | 0000000000000002 | 1 | 1 |
| temperature report | registered | 0000000000000002 | 1 | 2 |

It shows target SDPDEF information of temperature control and temperature report, while there is no target SDPDEF information of wind speed control, wind speed report, mode control, and mode report, then, the developer or the developing device of the target controlee device sends an SDP creation request to the SDPSP, and a specific implementation manner may be that the developer create from input of the SDPSP include SDPDEF information corresponding to the controlee device requirement. For ease of understanding, the target SDPDEF information corresponding to the above wind speed control, wind speed report, mode control, and mode report is respectively illustrated below by an example (it should be noted that what is shown here is merely one encapsulation form of the SDPDEF, the SDPDEF further may include other forms, and the encapsulation form of the SDPDEF in not specifically limited in the embodiments of the present disclosure.

Function: Wind Speed Control

| Name | Data Type | Numerical Value |
|---|---|---|
| class | Number | 1 |
| id | Number | 1 |
| payload | String | (payload list) |

Payload List:

| Name | Numerical Value |
|---|---|
| low | 00 |
| medium | 01 |
| high | 02 |

Function: Wind Speed Report

| Name | Data Type | Numerical Value |
|---|---|---|
| class | Number | 1 |
| id | Number | 2 |
| payload | String | (payload list) |

Payload List:

| Name | Numerical Value |
|---|---|
| low | 00 |
| medium | 01 |
| high | 02 |

Function: Mode Control

| Name | Data Type | Numerical Value |
|---|---|---|
| class | Number | 1 |
| id | Number | 3 |
| payload | String | (payload list) |

Payload List:

| Name | Numerical Value |
|---|---|
| off | 00 |
| fan | 01 |
| refrigeration | 02 |
| heating | 03 |
| dehumidification | 04 |

Function: Mode Report

| Name | Data Type | Numerical Value |
|---|---|---|
| class | Number | 1 |
| id | Number | 4 |
| payload | String | (payload list) |

Payload List:

| Name | Numerical Value |
|---|---|
| off | 00 |
| fan | 01 |
| refrigeration | 02 |
| heating | 03 |
| dehumidification | 04 |

After the target SDPDEF information is established and obtained, a decoder and an encoder of each SDPDEF information are further generated by the SDPSP or written with the computer language on the SDPSP.

For example, the SDPDEF status data of the wind speed report may be:

| Name | Data Type | Numerical Value |
|---|---|---|
| class | Number | 1 |
| id | Number | 2 |
| payload | String | 00 |

A corresponding decoding result may be:

| Name | Data Type | Numerical Value | | |
|---|---|---|---|---|
| Value | Map Object | Name | | Numerical Value |
| | | FanSpeed1 | | 0 |

The SDPDEF status data of the mode report may be:

| Name | Data Type | Numerical Value |
|---|---|---|
| class | Number | 1 |
| id | Number | 4 |
| payload | String | 00 |

A corresponding decoding result may be:

| Name | Data Type | Numerical Value | | |
|---|---|---|---|---|
| Value | Map Object | Name | | Numerical Value |
| | | Mode1 | | 0 |

A control instruction for the wind speed control (UI data sent by the APP of the control terminal) may be:

| Name | Data Type | Numerical Value |
|---|---|---|
| Class | Number | 1 |
| Id | Number | 1 |
| | | Name | Numerical Value |
| Value | Map Object | FanSpeed1 | 1 |

A corresponding encoding result may be:

| Name | Data Type | Numerical Value |
|---|---|---|
| class | Number | 1 |
| id | Number | 1 |
| payload | String | 01 |

A control instruction for the mode control (UI data sent by the APP of the control terminal) may be:

| Name | Data Type | Numerical Value |
|---|---|---|
| Class | Number | 1 |
| Id | Number | 3 |

| | | Name | Numerical Value |
|---|---|---|---|
| Value | Map Object | Mode1 | 1 |

A corresponding encoding result may be:

| Name | Data Type | Numerical Value |
|---|---|---|
| Class | Number | 1 |
| Id | String | 3 |
| payload | String | 01 |

After obtaining the decoder and the encoder of each piece of target SDPDEF information, the developer, or the developing device of the target controlee device uses the UI development module provided by the SDPSP to establish an independent UI tool used by each piece of target SDPDEF information.

The developer or the developing device needs to use the UI development modules provided on the SDPSP to design according to each piece of target SDPDEF information, to be able to display the decoded content and send out the data generated in control terminal. The developer may develop one or more that on UI tools on the same piece of SDPDEF information.

The UI development module provided on the SDPSP includes, but is not limited to:
1) a toggle switch module;
2) a bi-directional switch module;
3) a circular numerical-value bar (a circular progress control bar) module;
4) a long-type numerical-value bar module;
5) a text display column module;
6) a list-type text display column module; and
7) a drop-down list module.

Figure 12:
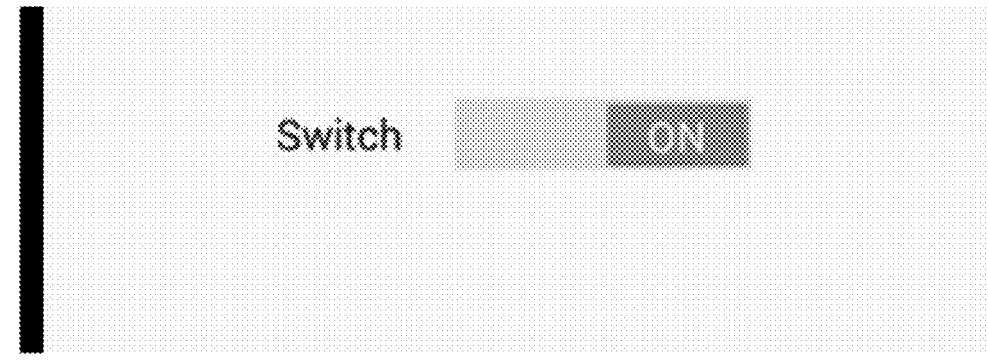
FIG. 12 is a schematic view of a switch control module provided in an embodiment of the present disclosure.

For example, a switch control UI develops by using the module on the SDPSP, as shown in FIG. 12, contains contents as shown in the table below.

| Name | Numerical Value |
|---|---|
| the number of cells occupied | 1*2 |
| field and position of displayed numerical value | centered on the right |
| correspondingly decoded numerical value name | Switch1 |
| control mode | Toggle Switch |
| numerical value type | Boolean |
| numerical value range | true, false |

Figure 13:
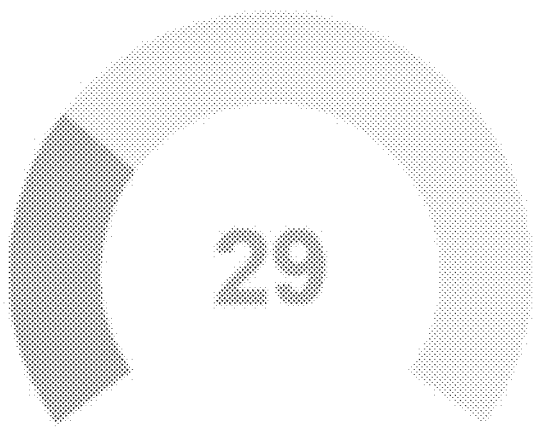
FIG. 13 is a schematic view of another switch control module provided in an embodiment of the present disclosure.

For another example, a dimming control UI develops by using the module on the SDPSP, as shown in FIG. 13, contains contents as shown in the table below.

| Name | Numerical Value |
|---|---|
| the number of cells occupied | 4*4 |
| field and position of displayed numerical value | centered |

-continued

| Name | Numerical Value |
|---|---|
| correspondingly decoded numerical value name | Dim1 |
| control mode | Circular Progress Control Bar |
| numerical value type | Integer |
| numerical value range | 0-100 |

For example, the wind speed control UI and report display UI may be:

| Name | Numerical Value |
|---|---|
| the number of cells occupied | 1*4 |
| field and position of displayed numerical value | centered |
| correspondingly decoded numerical value name | FanSpeed1 |
| control mode | scroll-type list |
| numerical value type | Integer |
| numerical value range | 0-2 |

A UI tool used for mode control and report may be:

| Name | Numerical Value |
|---|---|
| the number of cells occupied | 1*4 |
| field and position of displayed numerical value | centered |
| corresponding decoded numerical value name | Mode1 |
| control mode | scroll-type list |
| numerical value type | Integer |
| numerical value range | 0-4 |

After the above design is completed, the controlee device developer sends a registration request of the target SDP to the SDPDS device via SDPSP, wherein the target SDP includes at least one SDPDEF information which is defined by the developer of controlee device. Corresponding to each SDPDEF information comprises: a decoding and encoding tool, a SDPDEFID, and UI tool used in the control terminal. For the foregoing example, the target SDP includes: first SDPDEF information of wind speed control included an encoding and decoding tool of wind speed control SDPDEFID, a UI tool, and the second SDPDEF information of wind speed report included SDPDEFID, an encoding and decoding tool, a UI tool, the third SDPDEF information of mode control included SDPDEFID, an encoding and decoding tool, a UI tool, and fourth SDPDEF information of mode report included a SDPDEFID, an encoding and decoding tool, a UI tool.

After receiving and checking is passed of the registration request of the target SDP, the SDPDS device register the target creation information and generates SDP comprises: SDPID and at least one of SDPDEF information which is defined by the developer of the target controlee device and sends the SDP to the developer via SDPSP, specifically, it is possible that the target SDPID and the encapsulation tool are sent to the developer of the target controlee device by the SDPSP, or the target controlee device developer downloads the target SDPID and the encapsulation tool from the SDPDS device via the SDPSP, in this way, when reporting the success report corresponding to the above registration request, the SDP and SDPDEF information of the controlee device requirement registration have completed.

After the software development of the target controlee device is completed, hardware version number, battery mode, SDPDEF in used and default name are further registered on the SDPSP. For example:

| Name | Numerical Value |
| --- | --- |
| hardware version number | 1.0 |
| Pre-set name | air conditioner controller |

These controlee device information is registered on the SDPSP and the stored to the SDPDS device. For example, the controlee device information may be:

| Name | Numerical Value |
| --- | --- |
| Battery Mode | false |
| SDPDEF in used | mode control |
| | mode report |
| | wind speed control |
| | wind speed report |
| | temperature control |
| | temperature report |
| software version number | 1.0 |

The software data further may include: method and numerical value displayed on at least one APP list; at least one control interface formed by using the SDPDEF component; all used SDPDEFs; the SDPDEF sent when adding; the software version number; and the encoded software archive.

When the target controlee device is produced, the following data must be obtained from the SDPDS device: the identifier of the target controlee device (DID), the encryption key (DKEY), the production date, and SN.

Figure 14:
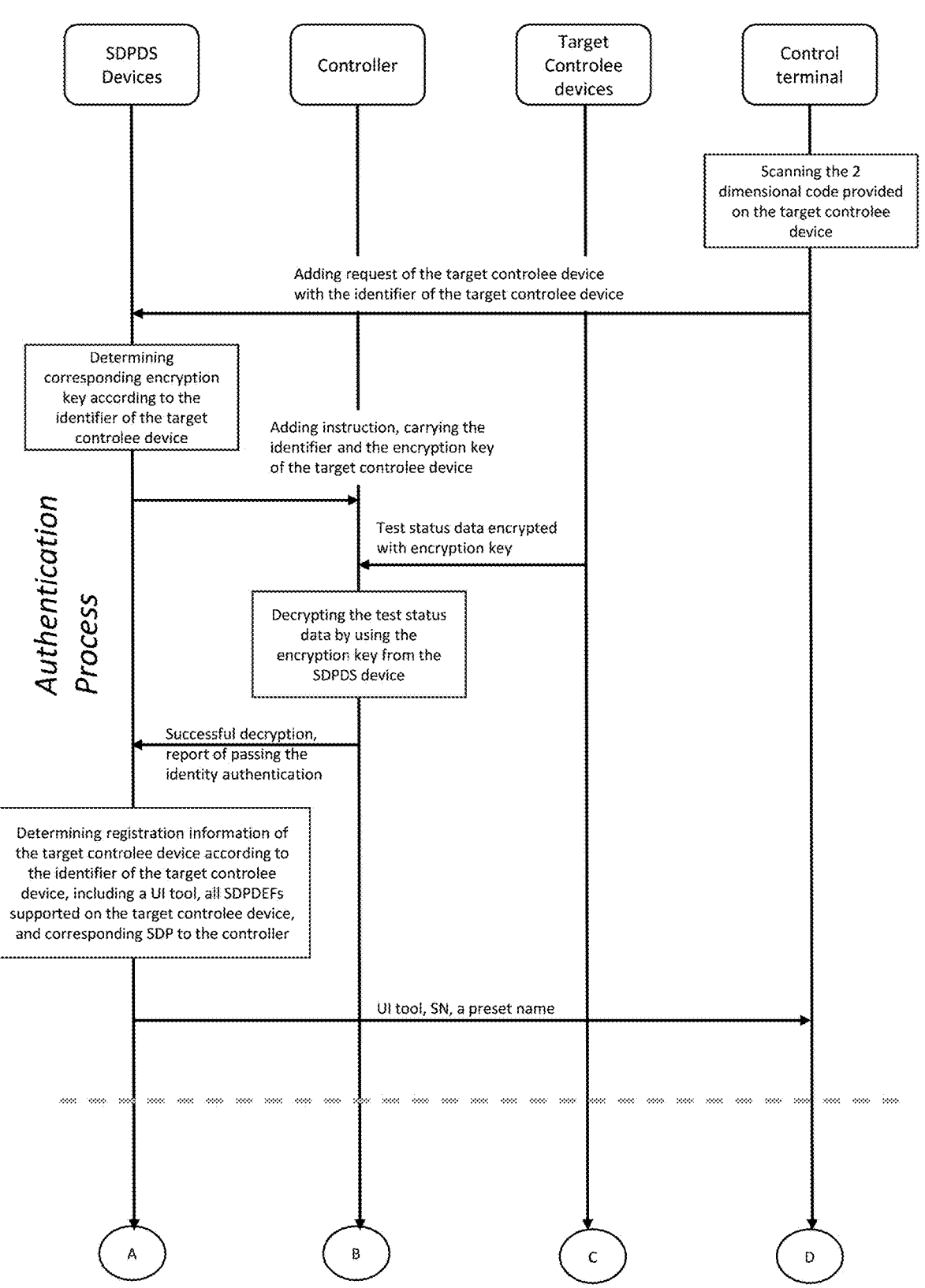
FIG. 14 is a schematic flowchart of an addition and control method for a target controlee device provided in an embodiment of the present disclosure.
Figure 14:
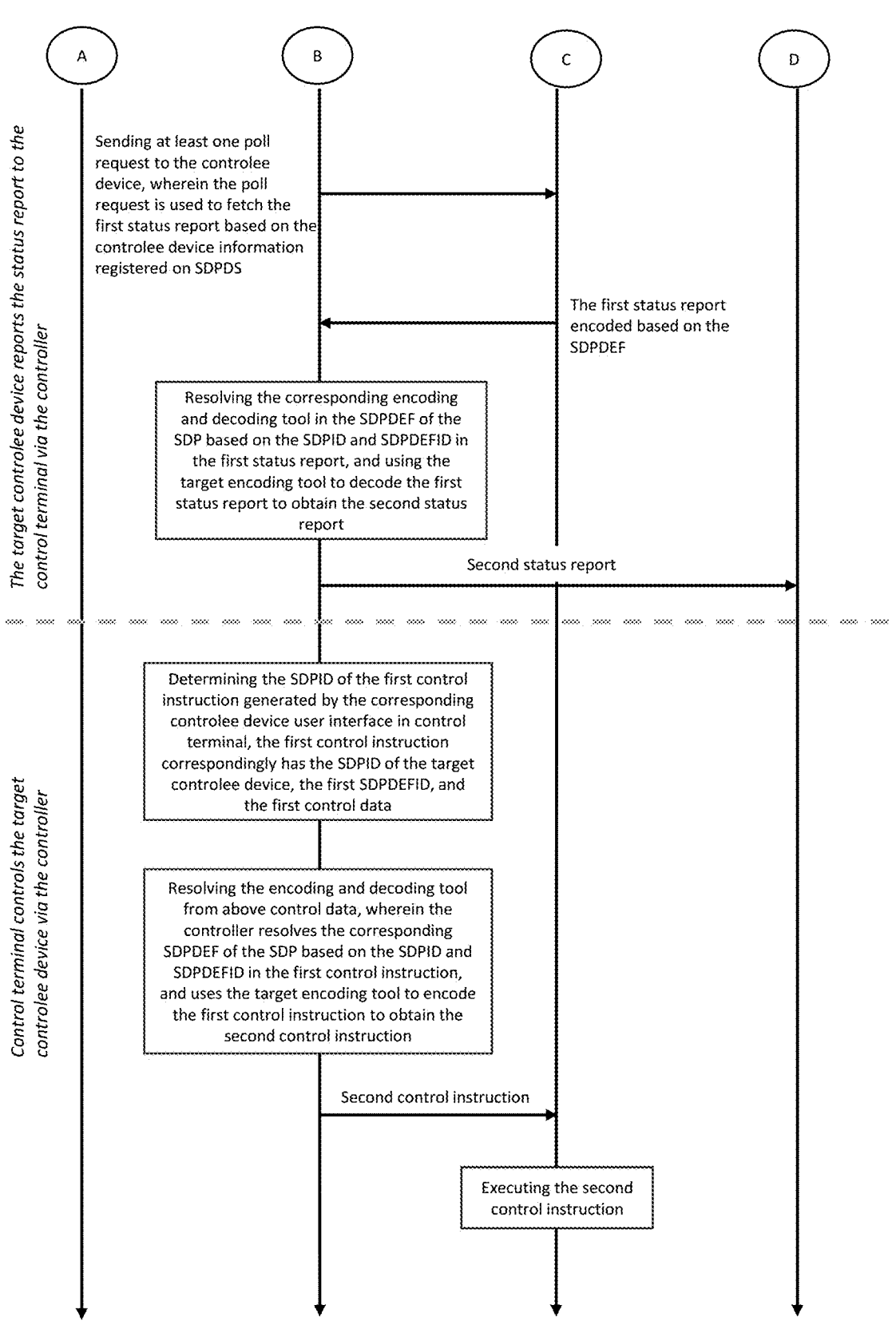

After the development of the above target controlee device is completed, the target controlee device may be added to the controller. Referring to FIG. 14, FIG. 14 is a schematic flowchart of an addition and control method for a target controlee device provided in an embodiment of the present disclosure. A user of the control terminal (APP) start the adding process in the app after press the button, the APP move to a two-dimensional code scanning page, and instructs the user to scan the two-dimensional code provided on the target controlee device, the user scans the two-dimensional code on the target controlee device according to the instruction, and then the APP of the control terminal can acquire and obtain the identifier of the target controlee device (DID).

Next, the APP of the control terminal sends an adding request of the target controlee device with the identifier of the target controlee device (DID) to the SDPDS device, the SDPDS device determines a corresponding encryption key (DKEY) according to the identifier of the target controlee device (DID) in the adding request, further, the SDPDS device sends an adding instruction to the controller with carrying the identifier (DID) and the encryption key (DKEY) of the target controlee device, causing the controller to enter an adding mode.

It can also be that the APP of the control terminal sends the adding request with the identifier of the target controlee device to the controller, and the controller acquires the encryption key (DKEY) of the target controlee device from the SDPDS device based on the identifier of the target controlee device.

After the controller obtains the encryption key (DKEY) of the target controlee device, the user pair the target controlee device with sends test report data according to a method provided on a user manual to the controller, the data is encrypted with the encryption key, and the controller decrypts the test status data by using the encryption key (DKEY) from the SDPDS device. The target controlee device is passed the identity authentication if the decryption succeeds, and the report of passing the identity authentication is returned to the SDPDS device, the SDPDS device determines registration information of the target controlee device according to the identifier of the target controlee device (DID), including: a UI tool, all SDPDEFs supported on the target controlee device, and corresponding SDP to the controller. In turn, the UI tool, SN, a preset name is sent to the control terminal via the controller or SDPDS.

The controller sending at least one poll request to the controlee device, wherein the poll request is used to fetch the first status report based on the controlee device information registered on SDPDS, in turn, the target controlee device returns to the controller the first status report encoded based on the SDPDEF.

For example, the returned first status report may be:

| Name | Data Type | Numerical Value |
| --- | --- | --- |
| DID | String | a |
| SDPID | String | 0000000000000003 |
| Class | Number | 1 |
| Id | String | 2 |
| payload | String | 00 |

The controller resolves the encoding and decoding tool from above status report. Specifically, the controller resolves the corresponding encoding and decoding tool (specifically, the decoding tool) in the SDPDEF of the SDP based on the SDPID and SDPDEFID (class, id) in the first status report, and use the target decoding tool to decode the first status report (specifically, value of the first status report) to obtain the second status report, which may be:

| Name | Data Type | Numerical Value |
| --- | --- | --- |
| DID | String | a |

| | | Name | Numerical Value |
| --- | --- | --- | --- |
| Value | Map Object | FanSpeed1 | 0 |

The controller then send a second status report to the control terminal, so that the control terminal renders a user interface which is created by the developer of the target controlee device using the UI tool and update the status of the target controlee device based on the second status report.

Subsequently, when the user controls the target controlee device, the controller determines the SDPID of the first control instruction generated by the corresponding controlee device user interface in control terminal, the first control instruction correspondingly has the SDPID of the target controlee device, the first SDPDEFID (including: Class and Id), and the first control data.

For example, the first control instruction generated by the corresponding controlee device user interface in control terminal may be:

| Name | Data Type | Numerical Value |
| --- | --- | --- |
| DID | String | a |
| SDPID | String | 0000000000000003 |

-continued

| | | | |
|---|---|---|---|
| Class | Number | | 1 |
| Id | Number | | 1 |

| | | Name | Numerical Value |
|---|---|---|---|
| Value | Map Object | FanSpeed1 | 1 |

The controller resolves the encoding and decoding tool from above control data. Specifically, the controller resolves the corresponding encoding and decoding tool (specifically, the encoding tool) in the SDPDEF of the SDP based on the SDPID and SDPDEFID (class, id) in the first control instruction, and use the target encoding tool to encode the first control instruction (specifically, value of the first control instruction) to obtain the second control instruction, that is:

| Name | Data Type | Numerical Value |
|---|---|---|
| DID | String | a |
| SDPID | String | 0000000000000003 |
| Class | Number | 1 |
| Id | String | 1 |
| payload | String | 01 |

The controller then sends the second control instruction to the target controlee device, so that the target controlee device executes the second control instruction.

Figures 15, 16:
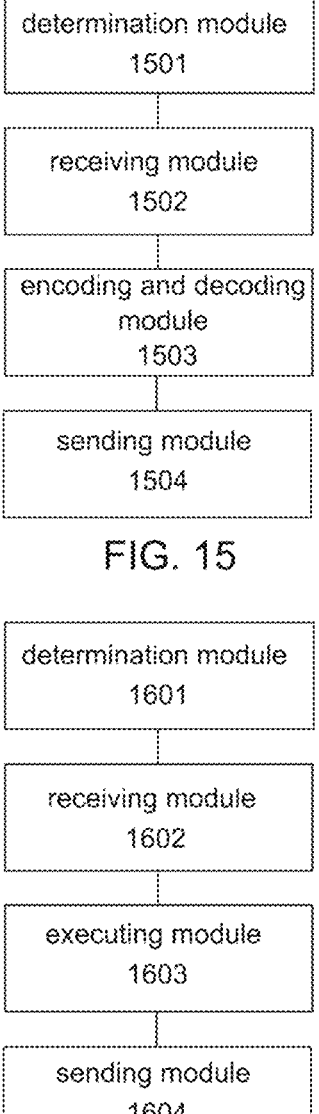
FIG. 15 is a structural schematic view of a communication apparatus provided in an embodiment of the present disclosure.
FIG. 16 is a structural schematic view of another communication apparatus provided in an embodiment of the present disclosure.

Referring to FIG. 15, FIG. 15 is a structural schematic view of a communication apparatus provided in an embodiment of the present disclosure. An SDP of a controlee device is pre-created, the SDP comprises: an SDPID and at least one of SDPDEF information which is defined and registered by the developer of controlee device. Corresponding to each SDPDEF information in SDP comprises: a decoding and encoding tool, and SDPDEFID, and UI tool used in the control terminal, and the method comprises: and a determination module 1501, configured to resolve an SDPID sent by a pairing controlee device after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP; and a receiving module 1502, configured to receive a first control instruction generated by the corresponding controlee device user interface in control terminal which is created by the developer of the target controlee device or generated by the automatic pre-set conditions from controller, wherein the first control instruction comprises at least one of the following: the target controlee device ID, and first control data; and an encoding and decoding module 1503, configured to render a first encoding and decoding tool corresponding to the first control instruction based on the target SDP and SDPDEF information, and encode the first control instruction based on the first encoding and decoding tool to obtain a second control instruction; and a sending module 1504, configured to send the second control instruction to the target controlee device, so that the target controlee device executes the second control instruction.

In some embodiments, the receiving module 1502 is further configured to receive a first status report sent by the target controlee device, and the first status report comprises at least one of the following: the target controlee device ID, a second SDPID, a second SDPDEFID, and first status data; and the encoding and decoding module is further configured to render a second encoding and decoding tool corresponding to the first status report based on the target SDP and SDPDEF information decode the first status report based on the second encoding and decoding tool to obtain a second status report; and the sending module is further configured to send a second status report to the control terminal, so that the control terminal renders a user interface which is created by the developer of the target controlee device using the UI tool and update the status of the target controlee device based on the second status report.

Referring to FIG. 16, FIG. 16 is a structural schematic view of another communication apparatus provided in an embodiment of the present disclosure. As shown in FIG. 16, the apparatus includes:

a determination module 1601, configured to resolves a registered SDPID and an encapsulation tool; and a receiving module 1602, configured to receive a second control instruction sent by a pairing controller which is acquired one or more than on SDPID(s) after identity authentication is passed, with the acquired SDPID the controller subsequently acquires corresponding SDP and SDPDEF information from SDPDS device in order to resolve the needed information for how to control and communicate with the controlee device, up to this stage this controlee device is interoperable with the controller, known as compatible controlee device, wherein the quantity of SDPIDs provide by the to be paired controlee device is at least one, and the corresponding SDP shall be created by the device developer or created by SDPSP from input of the device developer or created by adding SDPDEF information from developers of other compatible controlee devices via the SDPSP, wherein the second control instruction comprises at least one of the following: a target controlee device ID, a first SDPID, a first SDPDEFID, and second control data obtained by the controller encoding a first control instruction based on the first corresponding encoding and decoding tool an executing module 1603, configured to execute the second control instruction to obtain third status data; and a sending module 1604, configured to send the third status report obtained by the decapsulation tool to the counterpart controller comprises at least one of the following: the target controlee device ID, a third SDPID, a third SDPDEFID, and the third status data, so that the controller resolves a third encoding and decoding tool corresponding to the third status report based on the target SDP and SDPDEF information, and decoding the third status report to obtain a fourth status report before send to the control terminal, so that the control terminal renders a user interface which is created by the developer of the target controlee device using the UI tool and update the status of the target controlee device based on the fourth status report.

In some embodiments, the receiving module 1602 is further configured to receive a poll request sent by the counterpart controller, wherein the poll request is used to acquire the first status report encoded based on SDP and SDPDEF information, the first status report comprises at least one of the following: a target controlee device ID, a second SDPID, a second SDPDEFID, and first status data; and the sending module 1604 is further configured to send a first status report to the counterpart controller, so that the controller resolves a second encoding and decoding tool corresponding to the first status report based on the SDP and SDPDEF information and decoding the first status report based on the second encoding and decoding tool to obtain a second status report.

Figure 17:
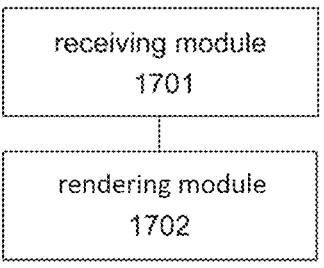
FIG. 17 is a structural schematic view of another communication apparatus provided in an embodiment of the present disclosure.
Figure 18:
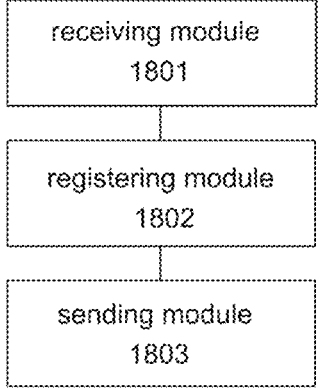
FIG. 18 is a structural schematic view of another communication apparatus provided in an embodiment of the present disclosure.

Referring to FIG. 17, FIG. 17 is a structural schematic view of another communication apparatus provided in an embodiment of the present disclosure. As shown in FIG. 17, the apparatus includes:

a receiving module 1701, configured to receive an SDP creation request sent by controlee device developer, wherein the creation request is sent by the developer; and a rendering module 1702, configured to generate a creation page or API, so that the developer of the target controlee device defined and created from input the information based on the creation information, the creation information comprises at least one SDPDEF information which is defined by the developer of controlee device. Corresponding to each SDPDEF information comprises: a decoding and encoding tool, a SDPDEFID, and UI tool used in the control terminal; and the receiving module 1701 is further configured to receive a registration request sent by the controlee device developer, wherein the registration request is sent by the developer after input the creation information in the creation page on SDPSP or provided API; and the sending module 1702 is further configured to send the registration request to an SDPDS device, so that the SDPDS device register the target creation information and generates SDP comprises: SDPID and at least one of SDPDEF information which is defined by the developer of the target controlee device, and sends the SDP to the developer via SDPSP Referring to FIG. 18, FIG. 18 is a structural schematic view of another communication apparatus provided in an embodiment of the present disclosure. As shown in FIG. 18, the apparatus includes:

a receiving module 1801, configured to receive a registration request sent by SDPSP, wherein the registration request with the creation information comprises at least one SDPDEF information which is defined by the developer of controlee device, so that the SDPDS generates SDP comprises: SDPID and at least one of SDPDEF information and send back to the developer via SDPSP.

a registering module 1802, configured to register the target SDP and generate a target SDPID of the target SDP creation information; and a sending module 1803, configured to send the target SDP to the developer of controlee device.

In some embodiments, the receiving module 1801 is further configured to receive an acquisition request sent by a controller, wherein the acquisition request includes the target SDP ID; and a determination module is further configured to identify an SDP corresponding to the target SDPID, wherein the SDP comprises: an SDPID, and at least one of SDPDEF information which is defined and registered by the developer of controlee device, corresponding to each SDPDEF information in SDP comprises: a decoding and encoding tool, and SDPDEFID, and UI tool; and a sending module, configured to send the target SDP to the controller.

An embodiment of the present disclosure further provides a machine-executable storage medium, the machine-executable storage medium stores machine-executable instructions, and when the machine-executable instructions are called and executed by a processor, the machine-executable instructions cause the processor to implement the above communication method provided by the embodiments of the present disclosure.

In the several embodiments provided in the present disclosure, it should be understood that the apparatus and the method disclosed also may be implemented in other manners. The apparatus embodiments described above are merely exemplary, for example, the flowcharts and the block diagrams in the accompanying drawings illustrate possible system architectures, functions, and operations of the apparatus, method, and computer program products according to multiple embodiments of the present disclosure. In this regard, each block in the flowchart or the block diagram may represent one module, program segment, or a part of code, and the module, the program segment, or the part of the code contains one or more executable instructions configured to achieve a specified logical function. It also should be noted that in some embodiments as substitution, the functions indicated in the blocks also may be proceeded in an order different from that indicated in the drawings. For example, two continuous blocks practically can be executed substantially in parallel, and they sometimes also may be executed in a reverse order, which depends upon a function involved. It also should be noted that each block in the block diagram and/or the flowchart, and combinations of the blocks in the block diagram and/or the flowchart can be realized by a dedicated hardware-based system configured to execute a specified function or action, or can be realized by a combination of dedicated hardware and computer instructions.

Finally, it should be indicated that the various embodiments above are merely used for illustrating the technical solutions of the present disclosure, rather than limiting the present disclosure. While the detailed description is made to the present disclosure with reference to the various preceding embodiments, those ordinarily skilled in the art should understand that they still could modify the technical solutions recited in the various preceding embodiments, or make equivalent substitutions to some or all of the technical features therein. These modifications or substitutions do not make the essence of the corresponding technical solutions depart from the scope of the technical solutions of the various embodiments of the present disclosure.

INDUSTRIAL APPLICABILITY

The present disclosure provides a communication method, apparatus, device, and system, relating to the technical field of communications. During the communication between the controlee device and the control terminal, translation can be performed by the controller. As the SDP of the controlee device and the SDPID of the SDP are pre-created, the controller can translate all functions corresponding to the SDP to controller's native execution coding. When any functions need to be altered or any function needs to be added, it only needs to follow the same process to re-create a new SDP and the SDPID of the SDP, that is, functions of all devices can be re-defined in ad-hoc manner and the controller counterpart will accommodate on demand base on the very same mechanism. All these processes can be automatically conducted without user intervention or even awareness, from the user perspective, they never need to worry about the FW compatibility with their controller, all they need is to add "another" new controlee device into their system.

What is claimed is:

1. A communication method, comprising:

acquiring, by a controller, a data package comprising one or more structured device control/communication protocol identifiers (SDPID(s)) from a pairing controlee device of one or more controlee devices subsequent to successful identity authentication of the one or more controlee devices, wherein the one or more SDPID(s) are a part of structured device control/communication protocol (SDP) information of the one or more controlee devices, in which the SDP is pre-created via the controlee device, wherein the SDP comprises the one or more SDPID(s) and SDP Data Encapsulation Format Description Table (SDPDEF) information registered via a SDP submission portal (SDPSP), wherein the SDPDEF information comprises at least one decoding and encoding tool, a SDPDEF identifier (SDPDEFID), and a user interface (UI) tool, and wherein the UI tool is used in a user control terminal;

acquiring, by the controller, the SDP including the SDPDEF information from a SDP data storage (SDPDS) device, based on the acquired one or more SDPID(s), to control and communicate with the one or more controlee devices, wherein, when a compatible SDPDEF information is available in the SDPDS device, the controller uses the compatible SDPDEF information, wherein, when no compatible SDPDEF information is found for a target controlee device in the SDPDS device, the SDPSP receives an SDP creation request, wherein the SDPSP provides a creation page or an application programming interface (API) to define the SDPDEF information, wherein the SDPDS device receives an SDP registration request submitted via the SDPSP to register the SDP, including the one or more SDPID(s) and the SDPDEF information, in the SDPDS device, wherein the one or more controlee devices are interoperable with the controller, wherein each of the one or more interoperable controlee devices is the pairing controlee device, wherein the one or more SDPID(s) are provided by the one or more controlee devices;

acquiring, by the user control terminal, control information of the pairing controlee device from the controller, wherein the control information comprises an assigned name of the pairing controlee device, and the corresponding information for generating a user interface of the user control terminal, such that the user control terminal generates the user interface, generates control data, transmits the control data to the one or more controlee devices, via the controller, and receives a status report from the one or more controlee devices, via the controller, upon transmission of the generated control data to the one or more controlee devices;

receiving, by the controller, a first control instruction generated by the user interface of the user control terminal or by automatic pre-set conditions configured in the controller, wherein the first control instruction is associated with the UI tool and includes at least one of: a target controlee device identifier (ID) and first control data, and wherein the target controlee device corresponds to the pairing controlee device of the one or more controlee devices; and resolving, by the controller, a first encoding and decoding tool defined in the SDPDEF information corresponding to the first control instruction based on target SDP including the SDPDEF information, and encoding the first control instruction based on the first encoding and decoding tool to obtain a second control instruction that includes at least one of: the target controlee device ID, a first SDPID of the one or more SDPID(s), a first SDPDEF, and second control data, such that the controller sends the second control instruction to the target controlee device.

2. The method of claim 1, further comprising:

receiving, by the controller, a first status report from the target controlee device, wherein the first status report comprises at least one of: the target controlee device ID, a second SDPID of the one or more SDPID(s), a second SDPDEFID, and first status data, wherein the second SDPID is either the same or different from the first SDPID;

resolving, by the controller, a second encoding and decoding tool corresponding to the first status report based on the target SDP, including the SDPDEF information, and decoding the first status report based on the second encoding and decoding tool to obtain a second status report that includes at least one of: the target controlee device ID and second status data; and sending, by the controller, the second status report to the user control terminal, such that the user control terminal renders the user interface using the UI tool, and updates a status of the target controlee device based on the second status report.

3. The method of claim 2, further comprising:

sending, by the controller, a poll request to the target controlee device, wherein the poll request is used to fetch the first status report encoded based on the target SDP including the SDPDEF information registered via the SDPSP.

4. The method of claim 3, further comprising:

receiving, by the target controlee device, the second control instruction from the controller which has acquired the one or more SDPID(s) subsequent to the successful identity authentication of the one or more controlee devices;

executing, by the target controlee device, the second control instruction and reporting third status data corresponding to an execution result;

sending, by the target controlee device, a third status report obtained by a decapsulation tool to the controller, wherein the third status report comprises at least one of: the target controlee device ID, a third SDPID of the one or more SDPID(s), a third SDPDEFID, and the third status data, such that the controller resolves a third encoding and decoding tool corresponding to the third status report based on the target SDP and the SDPDEF information, and decodes the third status report to obtain a fourth status report, wherein the first SDPID, the second SDPID, and the third SDPID are the same, or are different; and sending, by the controller, the fourth status report to the user control terminal, such that the user control terminal renders the user interface using the UI tool and updates the status of the target controlee device based on the fourth status report.

5. The method of claim 4, wherein a controlee device of the one or more controlee devices comprises a transceiver, a memory, and a processor, the memory storing a computer program executable by the processor, wherein execution of the computer program causes the processor to perform the steps of the method of claim 4.

6. The method of claim 1, further comprising:

receiving, by the SDPDS device, the SDP registration request from the SDPSP, wherein the SDP registration request comprises the SDPDEF information; and generating, by the SDPDS device, the SDP that comprises the one or more SDPID(s) and the SDPDEF information, wherein the SDPSP and the SDPDS device are arranged in the same device or in different devices.

7. The method of claim 6, further comprising:

receiving, by the SDPDS device, a solicit request from the controller, wherein the solicit request comprises the one or more SDPID(s) sent by the pairing controlee device subsequent to the successful identity authentication of the one or more controlee devices; and identifying, by the SDPDS device, the data package corresponding to a target SDPID and sending the data package to the controller, wherein the data package comprises the target SDPID and the SDPDEF information registered via the SDPSP.

8. The method of claim 7, wherein the SDPDS device comprises a transceiver, a memory, and a processor, the memory storing a computer program executable by the processor, wherein execution of the computer program causes the processor to perform the steps of the method of claim 7.

9. The method of claim 1, wherein the controller comprises a transceiver, a memory, and a processor, the memory storing a computer program executable by the processor, wherein execution of the computer program causes the processor to perform the steps of the method of claim 1.

10. The method of claim 1, wherein the SDPSP comprises a transceiver, a memory, and a processor, the memory storing a computer program executable by the processor, wherein execution of the computer program causes the processor to perform the steps of the method of claim 1.

11. A communication method, comprising:

acquiring, by a determination module, one or more structured device control/communication protocol identifiers (SDPID(s)) from a pairing controlee device of one or more controlee devices subsequent to successful identity authentication of the one or more controlee devices, wherein the one or more SDPID(s) are a part of a structured device control/communication protocol (SDP) of the one or more controlee devices, in which the SDP is pre-created via the controlee device, wherein the SDP comprises the one or more SDPID(s) and SDP Data Encapsulation Format Description Table (SDPDEF) information registered via a SDP submission portal (SDPSP), wherein the SDPDEF information comprises at least one decoding and encoding tool, a SDPDEF identifier (SDPDEFID), and a user interface (UI) tool used in a user control terminal;

acquiring, by the controller, the corresponding SDP including the SDPDEF information from a SDP data storage (SDPDS) device, based on the acquired one or more SDPID(s), to control and communicate with the one or more controlee devices, wherein, when a compatible SDPDEF information is available in the SDPDS device, the controller uses the compatible SDPDEF information, wherein, when no compatible SDPDEF information is found for a target controlee device in the SDPDS device, the SDPSP receives an SDP creation request, wherein the SDPSP provides a creation page or an application programming interface (API) to define the SDPDEF information, wherein the SDPDS device receives an SDP registration request submitted via the SDPSP to register the SDP, including the one or more SDPID(s) and the SDPDEF information, in the SDPDS device, wherein the one or more controlee devices are interoperable with the controller, wherein each of the one or more interoperable controlee devices is the pairing controlee device, wherein the one or more SDPID(s) are provided by the one or more controlee devices;

receiving, by a receiving module, a first control instruction generated by a user interface of the user control terminal or by automatic pre-set conditions configured in the controller, wherein the first control instruction comprises at least one of a target controlee device identifier (ID) and first control data;

resolving, by an encoding and decoding module, a first encoding and decoding tool defined in the SDPDEF information corresponding to the first control instruction based on a target SDP including the SDPDEF information, and encoding the first control instruction based on the first encoding and decoding tool to obtain a second control instruction; and sending, by a sending module, the second control instruction to the target controlee device for execution of the second control instruction.

12. The method of claim 11, wherein the receiving module is further configured to receive a first status report from the target controlee device, and wherein the first status report comprises at least one of: the target controlee device ID, a second SDPID of the one or more SDPID(s), a second SDPDEFID, and first status data;

the encoding and decoding module is further configured to resolve a second encoding and decoding tool corresponding to the first status report based on the target SDP including the SDPDEF information, and decode the first status report based on the second encoding and decoding tool to obtain a second status report; and the sending module is further configured to send the second status report to the user control terminal, such that the user control terminal renders the user interface using the UI tool, and updates a status of the target controlee device based on the second status report.

13. The method of claim 12, wherein the sending module is further configured to send a poll request to the target controlee device, wherein the poll request is used to fetch the first status report encoded based on the target SDP including the SDPDEF information registered via the SDPSP.

14. A communication apparatus, comprising:

a processor and a memory storing instructions, wherein execution of the instructions configures the processor to:

resolve a registered structured device control/communication protocol identifier (SDPID) and an encapsulation tool;

receive a second control instruction from a pairing controller which is acquired based on one or more SDPID(s) subsequent to successful identity authentication of one or more controlee devices, wherein with the one or more SDPID(s), a controller subsequently acquires a corresponding structured device control/communication protocol (SDP) including SDP Data Encapsulation Format Description Table (SDPDEF) information from a SDP data storage (SDPDS) device to control and communicate with the one or more controlee devices, wherein, when a compatible SDPDEF information is available in the SDPDS device, the controller uses the compatible SDPDEF information, wherein, when no compatible SDPDEF information is found for a target controlee device in the SDPDS device, an SDP submission portal (SDPSP) receives an SDP creation request, wherein the SDPSP provides a creation page or an application programming interface (API) to define and create the SDPDEF information, wherein the SDPDS device receives an SDP registration request submitted via the SDPSP to register the SDP, including the one or more SDPID(s) and the SDPDEF information, in the SDPDS device, wherein the one or more controlee devices are interoperable with the controller, wherein each of the one or more interoperable controlee devices is a pairing controlee device, wherein the one or more SDPID(s) are provided by the one or more controlee devices, wherein the second control instruction comprises at least one of: a target controlee device ID, a first SDPID of the one or more SDPID(s), a first SDPDEFID, and second control data obtained by the controller by encoding a first control instruction based on a first corresponding encoding and decoding tool;

execute the second control instruction to obtain third status data; and send a third status report obtained by a decapsulation tool to the controller, wherein the third status report comprises at least one of: the target controlee device ID, a third SDPID of the one or more SDPID(s), a third SDPDEFID, and the third status data, such that the controller resolves a third encoding and decoding tool corresponding to the third status report based on the target SDP and the SDPDEF information, and decodes the third status report to obtain a fourth status report before sending to a user control terminal, such that the user control terminal renders a user interface using a user interface (UI) tool and updates a status of the target controlee device based on the fourth status report.

15. The apparatus of claim 14, wherein the processor is further configured to receive a poll request from the controller, wherein the poll request is used to acquire a first status report encoded based on the SDP including the SDPDEF information, wherein the first status report comprises at least one of: the target controlee device ID, a second SDPID of the one or more SDPID(s), a second SDPDEFID, and first status data; and the processor is further configured to send the first status report to the controller, such that the controller resolves a second encoding and decoding tool corresponding to the first status report based on the SDP including the SDPDEF information and decodes the first status report based on the second encoding and decoding tool to obtain a second status report.

\* \* \* \* \*